(12) United States Patent
Fujishiro et al.

(10) Patent No.: US 10,492,239 B2
(45) Date of Patent: Nov. 26, 2019

(54) USER TERMINAL AND BASE STATION

(71) Applicant: KYOCERA CORPORATION, Kyoto (JP)

(72) Inventors: Masato Fujishiro, Yokohama (JP); Chiharu Yamazaki, Tokyo (JP); Kugo Morita, Higashiomi (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 143 days.

(21) Appl. No.: 15/660,555

(22) Filed: Jul. 26, 2017

(65) Prior Publication Data

US 2017/0325277 A1    Nov. 9, 2017

Related U.S. Application Data

(63) Continuation of application No. PCT/JP2016/051358, filed on Jan. 19, 2016.
(Continued)

(30) Foreign Application Priority Data

Jan. 28, 2015   (JP) ................. 2015-014021

(51) Int. Cl.
*H04W 76/15*   (2018.01)
*H04W 4/06*   (2009.01)
(Continued)

(52) U.S. Cl.
CPC .......... *H04W 76/15* (2018.02); *H04L 1/0027* (2013.01); *H04L 1/1861* (2013.01);
(Continued)

(58) Field of Classification Search
CPC ....... H04W 76/14; H04W 76/15; H04W 4/06; H04W 8/005; H04W 24/10; H04W 28/04;
(Continued)

(56) References Cited

U.S. PATENT DOCUMENTS

2004/0151133 A1*   8/2004   Yi .................... H04W 99/00
                                                    370/312
2007/0117579 A1   5/2007   Cai et al.
(Continued)

FOREIGN PATENT DOCUMENTS

JP   2007-221277 A   8/2007
JP   2007266844 A   10/2007
(Continued)

OTHER PUBLICATIONS

International Search Report issued in PCT/JP2016/051358; dated Mar. 29, 2016.
(Continued)

*Primary Examiner* — Habte Mered
(74) *Attorney, Agent, or Firm* — Studebaker & Brackett PC

(57) ABSTRACT

A user terminal includes: a receiver configured to receive multicast/broadcast data transmitted from a base station to a plurality of user terminals using the same downlink radio resources; a controller configured to select uplink radio resources to be used for transmission of feedback information, from a resource pool allocated from the base station to a group including the plurality of user terminals; and a transmitter configured to transmit the feedback information to the base station using the selected uplink radio resources.

15 Claims, 9 Drawing Sheets

Related U.S. Application Data

(60) Provisional application No. 62/162,204, filed on May 15, 2015.

(51) Int. Cl.

| | | |
|---|---|---|
| *H04W 24/10* | (2009.01) | |
| *H04W 28/04* | (2009.01) | |
| *H04W 76/14* | (2018.01) | |
| *H04L 29/06* | (2006.01) | |
| *H04W 8/00* | (2009.01) | |
| *H04W 48/12* | (2009.01) | |
| *H04W 72/04* | (2009.01) | |
| *H04L 1/00* | (2006.01) | |
| *H04L 1/18* | (2006.01) | |
| *H04W 72/00* | (2009.01) | |

(52) U.S. Cl.
CPC ........ *H04L 29/06088* (2013.01); *H04L 69/14* (2013.01); *H04W 4/06* (2013.01); *H04W 8/005* (2013.01); *H04W 24/10* (2013.01); *H04W 28/04* (2013.01); *H04W 48/12* (2013.01); *H04W 72/0453* (2013.01); *H04W 76/14* (2018.02); *H04L 2001/0093* (2013.01); *H04W 72/005* (2013.01)

(58) Field of Classification Search
CPC ............. H04W 48/12; H04W 72/0453; H04W 72/005; H04L 1/0027; H04L 1/1861; H04L 29/06088; H04L 2001/0093
See application file for complete search history.

(56) References Cited

U.S. PATENT DOCUMENTS

| | | |
|---|---|---|
| 2007/0232238 A1 | 10/2007 | Kawasaki |
| 2008/0049749 A1* | 2/2008 | Xiao .................... H04L 1/1692 370/390 |
| 2010/0309836 A1 | 12/2010 | Sugawara et al. |
| 2011/0075594 A1 | 3/2011 | Burstrom et al. |
| 2011/0219281 A1 | 9/2011 | Wang et al. |
| 2013/0136073 A1 | 5/2013 | Kato |
| 2016/0308684 A1* | 10/2016 | Zhu ........................ H04W 4/06 |
| 2016/0373903 A1* | 12/2016 | Zeira ................... H04W 72/005 |

FOREIGN PATENT DOCUMENTS

| | | |
|---|---|---|
| JP | 2009-517925 A | 4/2009 |
| JP | 2010-537518 A | 12/2010 |
| JP | 2011-519504 A | 7/2011 |
| JP | 2011-211321 A | 10/2011 |
| WO | 2009/096305 A1 | 8/2009 |

OTHER PUBLICATIONS

Huawei et al.; "New Study Item Proposal for Support of single-cell point-to-multipoint transmission in LTE"; 3GPP TSG RAN Meeting #66; RP-142205; Dec. 8-11, 2014; pp. 1-6; Maui, Hawaii, USA.

Alcatel-Lucent; "Conditional HARQ Retransmission for Single-Cell MBMS and Text Proposal"; 3GPP RAN WG2 #60; R2-075049; Nov. 5-9, 2007; pp. 1-5; Jeju, Korea.

Nokia Siemens Networks et al.; "MBMS Feedback Configuration"; 3GPP TSG-RAN WG2 Meeting #61; R2-080953; Feb. 11-15, 2008; pp. 1-4; Sorrento, Italy.

Etri; "Design of HARQ Feedback Channel for MBMS"; 3GPP TSG RAN WG2 #56; R2-063277; Nov. 6-10, 2006; pp. 1-4; Riga, Latvia.

Motorola; "E-MBMS with Feedback"; 3GPP TSG RAN1 #46; R1-062083; Aug. 28-Sep. 1, 2006; pp. 1-2; Tallinn, Estonia.

Vodafone; "Design of MBMS in LTE/SAE"; 3GPP TSG RAN WG2 Meeting #57; R2-070899; Feb. 12-16, 2007; pp. 1-10; St. Louis, Missouri, USA.

Motorola; "Control Signalling for Single-Cell MBMS Transmission"; 3GPP TSG RAN1 #52-Bis; R1-081283; Mar. 31-Apr. 4, 2008; pp. 1-2; Shenzhen, China.

Siemens; "Support of Idle Mode for MBMS"; 3GPP TSG-RAN WG2 Meeting #33; R2-022886; Sep. 12-15, 2002; pp. 1-4; Sophia Antipolis, France.

Samsung, "Utilization of multiple resource pools based on RSRP for type-1 discovery", 3GPP TSG RAN WG1 Meeting #78bis, R1-143867, Oct. 6-Oct. 10, 2014, 7pages, Ljubljana, Slovenia.

* cited by examiner

USER TERMINAL AND BASE STATION

CROSS REFERENCE

This application claims the benefit of Japanese Priority Patent Application JP 2015-014021 filed Jan. 28, 2015 and U.S. Provisional Application No. 62/162,204 filed May 15, 2015, the entire contents of which are incorporated herein by reference.

TECHNICAL FIELD

The present disclosure relates to a user terminal and a base station in a mobile communication system.

BACKGROUND ART

In mobile communication systems, unicast (point to point (PTP)) transmission is commonly applied to downlink between a user terminal and a base station.

In downlink unicast transmission, the user terminal transmits feedback information related to downlink to the base station. The feedback information is delivery confirmation information (ACK/NACK) indicating whether or not downlink data has been correctly received and channel state information (CSI) indicating a downlink channel state. The base station controls transmission of the downlink data on the basis of the feedback information.

In recent years, multicast/broadcast (point to multipoint (PTM)) transmission has attracted public attention (for example, see Non Patent Literature 1).

In downlink multicast/broadcast transmission, the base station transmits the same downlink data (hereinafter referred to appropriately as "multicast/broadcast data") to a plurality of user terminals using the same downlink radio resources. The multicast/broadcast transmission can improve use efficiency of the downlink radio resources, compared with the unicast transmission.

CITATION LIST

Non Patent Literature

Non Patent Literature 1: 3GPP contribution "RP-142205"

SUMMARY

A user terminal according to a first aspect includes: a receiver configured to receive multicast/broadcast data transmitted from a base station to a plurality of user terminals using the same downlink radio resources; a transmitter configured to transmit, to the base station, feedback information related to downlink when a radio state between the base station and the user terminal is worse than a threshold value; and a controller configured to suspend transmission of the feedback information when the radio state is better than the threshold value.

A base station according to a second aspect includes: a transmitter configured to transmit multicast/broadcast data to a plurality of user terminals using the same downlink radio resources; a receiver configured to receive feedback information related to downlink only from a specific user terminal among the plurality of user terminals; and a controller configured to control transmission of the multicast/broadcast data on the basis of the feedback information. The specific user terminal is a user terminal in which a radio state with the base station is worse than a threshold value.

A user terminal according to a third aspect includes: a receiver configured to receive multicast/broadcast data transmitted from a base station to a plurality of user terminals using the same downlink radio resources; a controller configured to select uplink radio resources to be used for transmission of feedback information, from a resource pool allocated from the base station to a group including the plurality of user terminals; and a transmitter configured to transmit the feedback information to the base station using the selected uplink radio resources.

A base station according to a fourth aspect includes: a controller configured to allocate a resource pool usable for transmission of feedback information to a group including a plurality of user terminals; a transmitter configured to transmit multicast/broadcast data to the plurality of user terminals using the same downlink radio resources; and a receiver configured to receive the feedback information transmitted from the plurality of user terminals using uplink radio resources selected from the resource pool.

A user terminal according to a fifth aspect includes: a transmitter configured to transmit either a positive response indicating that downlink data is correctly received or a negative response indicating that reception of the downlink data fails to a base station as feedback information, when downlink unicast transmission is applied; and a controller configured to suspend transmission of the positive response so that only the negative response out of the positive response and the negative response is transmitted to the base station as the feedback information, when downlink multicast/broadcast transmission is applied.

A base station according to a sixth aspect includes: a receiver configured to receive either a positive response indicating that downlink data is correctly received or a negative response indicating that reception of the downlink data fails from a user terminal as feedback information, when downlink unicast transmission is applied. When downlink multicast/broadcast transmission is applied, the receiver is configured to receive only the negative response out of the positive response and the negative response from the user terminal as the feedback information.

A user terminal according to a seventh aspect is used in a mobile communication system supporting multicast/broadcast transmission to a plurality of user terminals. The user terminal includes: a receiver configured to receive multicast/broadcast data in an RRC idle state; a transmitter configured to transmit, to a base station, a connection request message for transitioning from the RRC idle state to an RRC connected state on the basis of a reception state of the multicast/broadcast data; and a controller configured to include, into the connection request message, information related to the multicast/broadcast data.

A base station according to an eighth aspect performs multicast/broadcast transmission to a plurality of user terminals. The base station includes: a receiver configured to receive a connection request message for transitioning to an RRC connected state, from a user terminal that received multicast/broadcast data in an RRC idle state. The connection request message is transmitted from the user terminal on the basis of a reception state of the multicast/broadcast data. The connection request message includes information related to the multicast/broadcast data.

DESCRIPTION OF EMBODIMENTS

[Overview of Embodiments]

Figure 1:
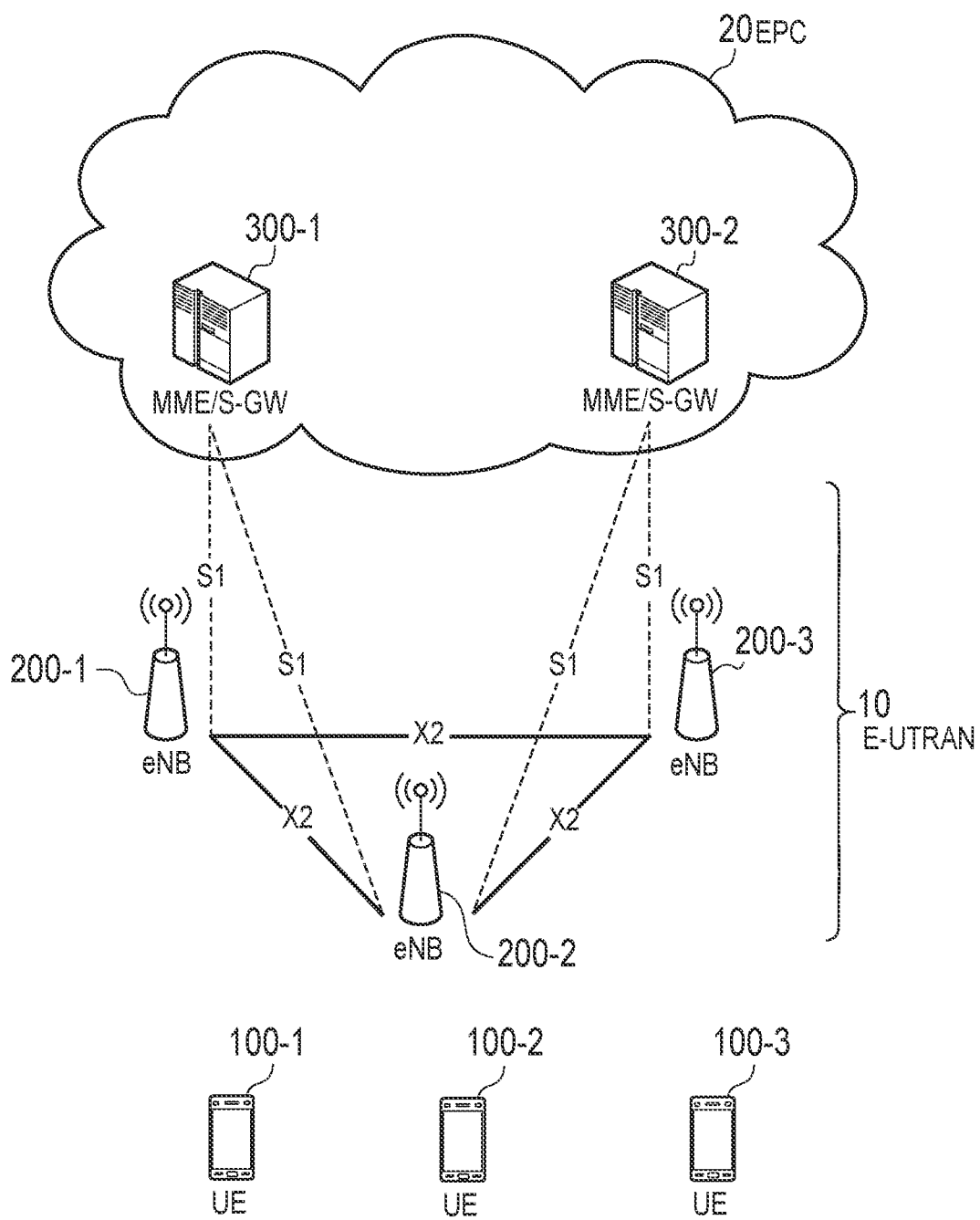
FIG. 1 is a configuration diagram of an LTE system according to first to fourth embodiments.

A feedback mechanism in the unicast transmission is assumed to be introduced in the multicast/broadcast transmission in order to improve the reliability of the multicast/broadcast transmission.

In this case, a plurality of user terminals can transmit the feedback information to one base station. As a result, feedback control becomes complicated, and uplink radio resources may become tight.

In this regard, embodiments provide a user terminal and a base station which are capable of enabling efficient feedback in the multicast/broadcast transmission.

A user terminal according to a first embodiment includes: a receiver configured to receive multicast/broadcast data transmitted from a base station to a plurality of user terminals using the same downlink radio resources; a transmitter configured to transmit, to the base station, feedback information related to downlink when a radio state between the base station and the user terminal is worse than a threshold value; and a controller configured to suspend transmission of the feedback information when the radio state is better than the threshold value.

In the first embodiment, the receiver is configured to receive configuration information for setting the threshold value from the base station. The controller is configured to set the threshold value on the basis of the configuration information.

In the first embodiment, the transmitter is configured to transmit, to the base station, first information for requesting an allocation of uplink radio resources used for transmission of the feedback information when the radio state becomes worse than the threshold value.

In the first embodiment, the transmitter is configured to transmit, to the base station, second information for requesting release of the uplink radio resources when the radio state becomes better than the threshold value.

In the first embodiment, the controller is configured to perform switching from a first mode in which transmission suspension of the feedback information is enabled, to a second mode in which the transmission suspension of the feedback information is disabled, in response to a notification given from the base station.

A base station according to a first embodiment includes: a transmitter configured to transmit multicast/broadcast data to a plurality of user terminals using the same downlink radio resources; a receiver configured to receive feedback information related to downlink only from a specific user terminal among the plurality of user terminals; and a controller configured to control transmission of the multicast/broadcast data on the basis of the feedback information. The specific user terminal is a user terminal in which a radio state with the base station is worse than a threshold value.

In the first embodiment, the transmitter is configured to transmit configuration information for setting the threshold value to the plurality of user terminals.

In the first embodiment, the receiver is configured to receive, from the specific user terminal, first information for requesting an allocation of uplink radio resources used for transmission of the feedback information. The controller is configured to allocate the uplink radio resources to the specific user terminal in response to the reception of the first information.

In the first embodiment, the receiver is configured to receive, from the specific user terminal, second information for requesting release of the uplink radio resources. The controller is configured to release the uplink radio resources in response to the reception of the second information.

In the first embodiment, the receiver is configured to receive a plurality of pieces of feedback information from a plurality of specific user terminals. The controller is configured to: select a specific user terminal having the worst radio state among the plurality of specific user terminals on the basis of the plurality of pieces of feedback information; and control transmission of the multicast/broadcast data in accordance with the feedback information of the selected specific user terminal.

In the first embodiment, the controller is configured to: determine whether or not switching from a first mode in which the feedback information is received only from the specific user terminal to the second mode in which the feedback information is received from all of the plurality of user terminals on the basis of a parameter associated with an uplink load state; and notify the plurality of user terminals of a determination result.

A user terminal according to a second embodiment includes: a receiver configured to receive multicast/broadcast data transmitted from a base station to a plurality of user terminals using the same downlink radio resources; a controller configured to select uplink radio resources to be used for transmission of feedback information, from a resource pool allocated from the base station to a group including the plurality of user terminals; and a transmitter configured to transmit the feedback information to the base station using the selected uplink radio resources.

In the second embodiment, the resource pool includes uplink radio resources different from a physical uplink control channel which is individually allocated from the base station to each of the user terminals.

In the second embodiment, the receiver is configured to receive configuration information related to the resource pool from the base station. The configuration information includes at least one of: a difference between a reference point on a time axis and a start point of the resource pool; a difference between a reference point on a frequency axis and a start point of the resource pool; a range of the resource pool on the time axis; and a range of the resource pool on the frequency axis.

The resource pool designated by the configuration information may indicate a predetermined pattern that combines different frequency resources in different time resources, for example.

In the second embodiment, the controller is configured to select uplink radio resources used for transmission of the feedback information from the resource pool on the basis of unique information allocated from the base station to the user terminal or unique information preconfigured to the user terminal.

In the second embodiment, the controller is configured to perform switching from a first mode in which the feedback information is transmitted using the resource pool, to a second mode in which the feedback information is transmitted using a physical uplink control channel which is individually allocated from the base station to each of the user terminal, in response to a notification given from the base station.

A base station according to a second embodiment includes: a controller configured to allocate a resource pool usable for transmission of feedback information to a group including a plurality of user terminals; a transmitter configured to transmit multicast/broadcast data to the plurality of user terminals using the same downlink radio resources; and a receiver configured to receive the feedback information transmitted from the plurality of user terminals using uplink radio resources selected from the resource pool.

In the second embodiment, the resource pool includes uplink radio resources different from a physical uplink control channel which is individually allocated from the base station to each of the user terminals.

In the second embodiment, the transmitter is configured to transmit configuration information related to the resource pool to the plurality of user terminals. The configuration information includes at least one of: a difference between a reference point on a time axis and a start point of the resource pool; a difference between a reference point on a frequency axis and a start point of the resource pool; a range of the resource pool on the time axis; and a range of the resource pool on the frequency axis.

The resource pool designated by the configuration information may indicate a predetermined pattern that combines different frequency resources in different time resources, for example.

In the second embodiment, the controller is configured to: determine whether or not switching from a first mode in which the feedback information is transmitted using the resource pool, to a second mode in which the feedback information is transmitted using a physical uplink control channel which is individually allocated from the base station to each of the user terminals; and notify the plurality of user terminals of a determination result.

In the second embodiment, the feedback information is one of a plurality of index values. A plurality of resource pools corresponding to the plurality of index values are allocated from the base station to the user terminal. When a predetermined index value is transmitted to the base station as the feedback information, the controller selects a resource pool corresponding to the predetermined index value among the plurality of resource pools.

In the second embodiment, a radio resource common to the plurality of user terminals and/or a signal sequence common to the plurality of user terminals are associated with each of the plurality of resource pools. The transmitter is configured to transmit the feedback information to the base station using the common radio resources and/or the common signal sequence corresponding to the selected resource pool.

A user terminal according to a third embodiment includes: a transmitter configured to transmit either a positive response indicating that downlink data is correctly received or a negative response indicating that reception of the downlink data fails to a base station as feedback information, when downlink unicast transmission is applied; and a controller configured to suspend transmission of the positive response so that only the negative response out of the positive response and the negative response is transmitted to the base station as the feedback information, when downlink multicast/broadcast transmission is applied.

In the third embodiment, when the multicast/broadcast transmission is applied, the transmitter is configured to transmit the negative response using radio resources and a signal sequence which are common to a plurality of user terminals that perform the multicast/broadcast transmission with the base station.

In the third embodiment, when the multicast/broadcast transmission is applied, the transmitter is configured to transmit a demodulation reference signal of the negative response using the radio resources and the signal sequence which are common to the plurality of user terminals.

In the third embodiment, when the multicast/broadcast transmission is applied, the controller is configured to perform switching from a first mode in which only the negative response is transmitted to the base station as the feedback information, to a second mode in which either the positive response or the negative response is transmitted to the base station as the feedback information, in response to a notification given from the base station.

In the third embodiment, the transmitter is configured to further transmit notification information different from the negative response to the base station. The notification information is: information indicating that the user terminal desires a change prohibition of a modulation scheme and/or an coding scheme applied to the multicast/broadcast transmission; or information indicating that the user terminal desires a change of the modulation scheme and/or the coding scheme.

A base station according to a third embodiment includes: a receiver configured to receive either a positive response indicating that downlink data is correctly received or a negative response indicating that reception of the downlink data fails from a user terminal as feedback information, when downlink unicast transmission is applied. When downlink multicast/broadcast transmission is applied, the receiver is configured to receive only the negative response out of the positive response and the negative response from the user terminal as the feedback information.

In the third embodiment, the base station further includes a controller configured to allocate common radio resources and a common signal sequence to a plurality of user terminals that perform the multicast/broadcast transmission with the base station for transmission of the negative response, when the multicast/broadcast transmission is applied.

In the third embodiment, when the multicast/broadcast transmission is applied, the controller is configured to allocate common radio resources and a common signal sequence to the plurality of user terminals for transmission of a demodulation reference signal of the negative response.

In the third embodiment, when the multicast/broadcast transmission is applied, the base station is configured to: determine whether or not switching from a first mode in which only the negative response is transmitted as feedback information, to a second mode in which either the positive response or the negative response is transmitted as the feedback information, on the basis of a parameter related to an uplink load state; and notify the plurality of user terminals of a notification of a determination result.

First Embodiment

Hereinafter, embodiments in which the present disclosure is applied to an LTE system which is a mobile communication system based on the 3GPP standard will be described.

(Overview of LTE System)

First, a system configuration of the LTE system will be described. FIG. 1 is a configuration diagram of the LTE system.

The LTE system includes user equipment (UE) 100, an evolved-UMTS terrestrial radio access network (E-UTRAN) 10, and an evolved packet core (EPC) 20 as illustrated in FIG. 1.

The UE 100 corresponds to user terminal. The UE 100 is a mobile communication apparatus and performs radio communication with a cell (a serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function (hereinafter referred to simply as "data"), a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs data transfer control. The MME/S-GW 300 is connected to the eNB 200 via an S1 interface. The E-UTRAN 10 and the EPC 20 constitute a network.

In addition, the E-UTRAN 10 includes a multi-cell/multicast coordinating entity (MCE). The MCE is connected to the eNB 200 via an M2 interface and connected to an MME 300 via an M3 interface. The MCE performs multicast-broadcast single-frequency network (MBSFN) radio resource management, allocation and the like.

The EPC 20 includes a multimedia broadcast multicast service gateway (MBMS GW). The MBMS GW is connected to the eNB 200 via an M1 interface, connected to the MME 300 via an Sm interface, and connected to a BM-SC (which will be described later) via SG-mb and SGi-mb interfaces. The MBMS GW plays a role such as an S-GW for multimedia broadcast multicast service (MBMS) and performs data transmission and session control of IP multicast to the eNB 200.

The EPC 20 further includes a broadcast multicast service center (BM-SC). The BM-SC is connected to the MBMS GW via the SG-mb and SGi-mb interfaces and connected to a P-GW via an SGi interface. The BM-SC plays a role such as a P-GW for MBMS, and mainly manages and allocates a temporary mobile group identity (TMGI).

Furthermore, a Group Communication Service Application Server (GCS AS) is installed outside the EPC 20 (that is, the Internet). The GCS AS is an application server for group communication. The GCS AS is connected to the BM-SC via MB2-U and MB2-C interfaces and connected to the P-GW via the SGi interface. The GCS AS performs management of groups in group communication, data delivery (also including determination about whether the MBMS is used or the unicast is used), and the like.

Figure 2:
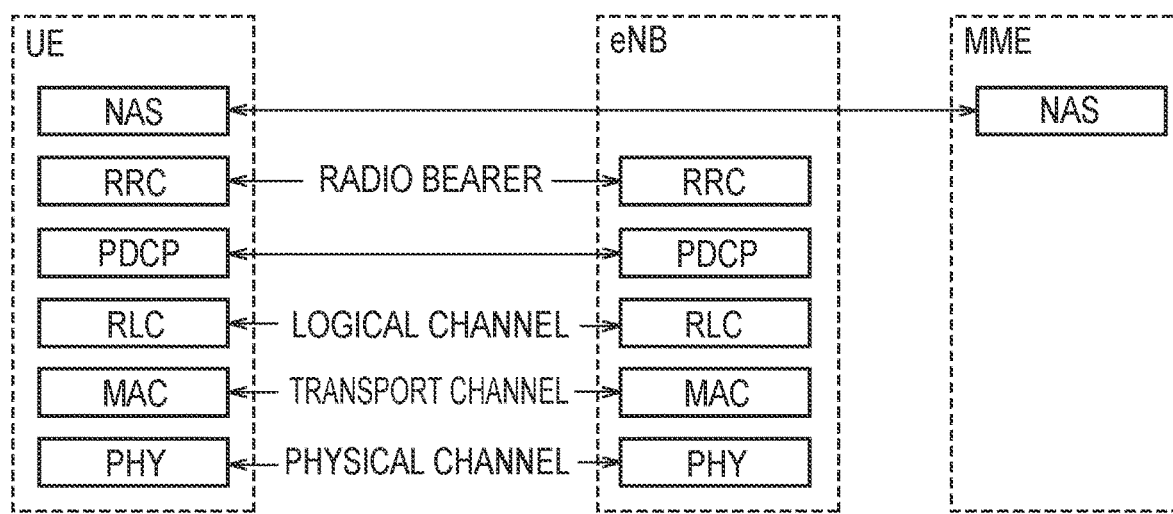
FIG. 2 is a protocol stack diagram of a radio interface according to the first to fourth embodiments.

FIG. 2 is a protocol stack diagram of a radio interface in the LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. Data and a control signal are transmitted between the physical layer of the UE 100 and the physical layer of the eNB 200 via the physical channel.

The MAC layer performs priority control of data, a retransmission process by hybrid ARQ (HARQ), a random access procedure, and the like. Data and a control signal are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. Data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal. A message (RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. When there is a connection (RRC connection) between the RRC of the UE 100 and the RRC of the eNB 200, the UE 100 is in an RRC connected state, and otherwise, the UE 100 is in an RRC idle state.

A non-access stratum (NAS) layer located above the RRC layer performs session management, mobility management, and the like.

Figure 3:
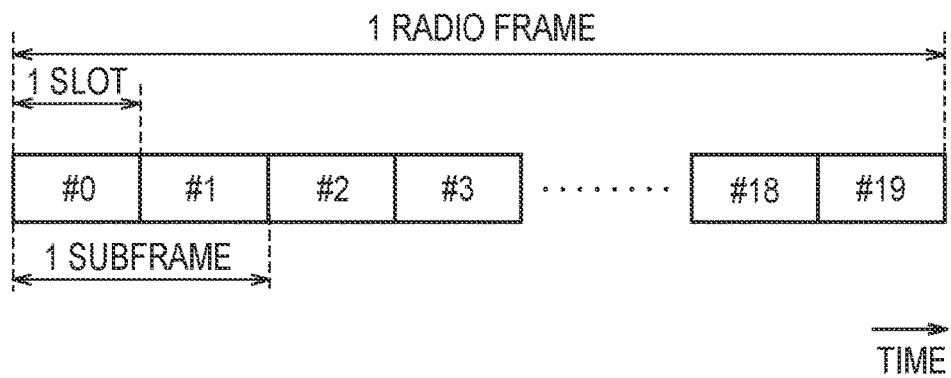
FIG. 3 is a configuration diagram of a radio frame according to the first to fourth embodiments.

FIG. 3 is a configuration diagram of a radio frame used in the LTE system. In the LTE system, orthogonal frequency division multiplexing access (OFDMA) is applied to downlink, and Single Carrier Frequency Division Multiple Access (SC-FDMA) is applied to uplink.

As illustrated in FIG. 3, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. One symbol and one subcarrier constitute one resource element (RE). Among the radio resources (time/frequency resources) allocated to the UE 100, frequency resources can be specified by resource blocks, and time resources can be specified by subframes (or slots).

In the downlink, an interval of first few symbols of each subframe is a region used mainly as a physical downlink control channel (PDCCH) for transmitting a downlink control signal. The remaining parts of each subframe are a region that can be mainly used as a physical downlink shared channel (PDSCH) for transmitting downlink data. A downlink reference signal such as a cell specific reference signal (CRS) is arranged in each subframe.

In the uplink, both end portions of each subframe in the frequency direction are regions used mainly as a physical uplink control channel (PUCCH) for transmitting an uplink control signal. The remaining parts of each subframe are a region that can be used mainly as a physical uplink shared channel (PUSCH) for transmitting uplink data. An uplink reference signal such as a sounding reference signal (SRS) is arranged in each subframe.

(Configuration of UE 100)

Figure 4:
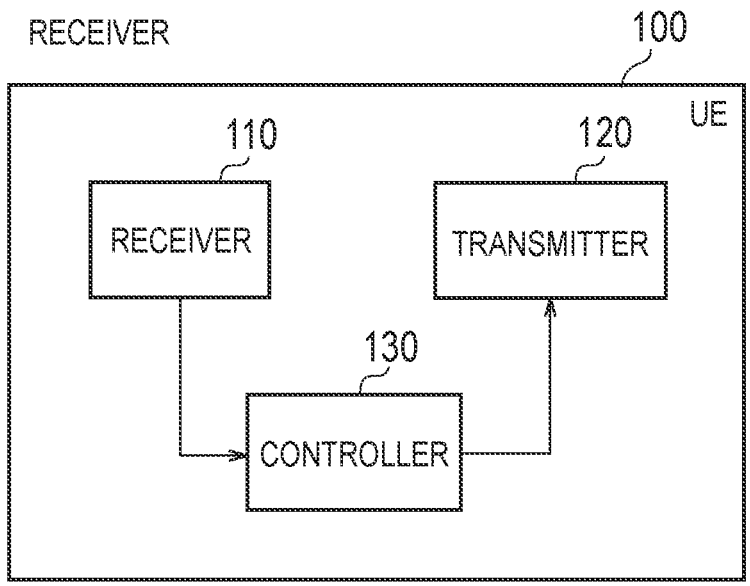
FIG. 4 is a block diagram of a UE according to the first to fourth embodiments.

FIG. 4 is a block diagram illustrating a configuration of the UE 100 (the user terminal). The UE 100 includes a receiver 110, a transmitter 120, and a controller 130 as illustrated in FIG. 4.

The receiver 110 performs various kinds of receptions under the control of the controller 130. The receiver 110 includes an antenna and a receiving device. The receiving device converts a radio signal received through the antenna into a baseband signal (reception signal) and outputs the baseband signal to the controller 130.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal from the antenna.

The controller 130 controls various kinds of control in the UE 100. The controller 130 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor may include a codec that encodes and decodes audio/video signals. The processor executes various kinds of processes to be described later and various kinds of communication protocols described above.

The UE 100 may include a user interface and a battery. The user interface is an interface with the user who owns the UE 100, and includes, for example, a display, a microphone, a speaker, various kinds of buttons, or the like. The user interface receives an operation from the user and outputs a signal indicating content of the operation to the controller 130. The battery stores electric power to be supplied to the blocks of the UE 100.

(Configuration of eNB 200)

Figure 5:
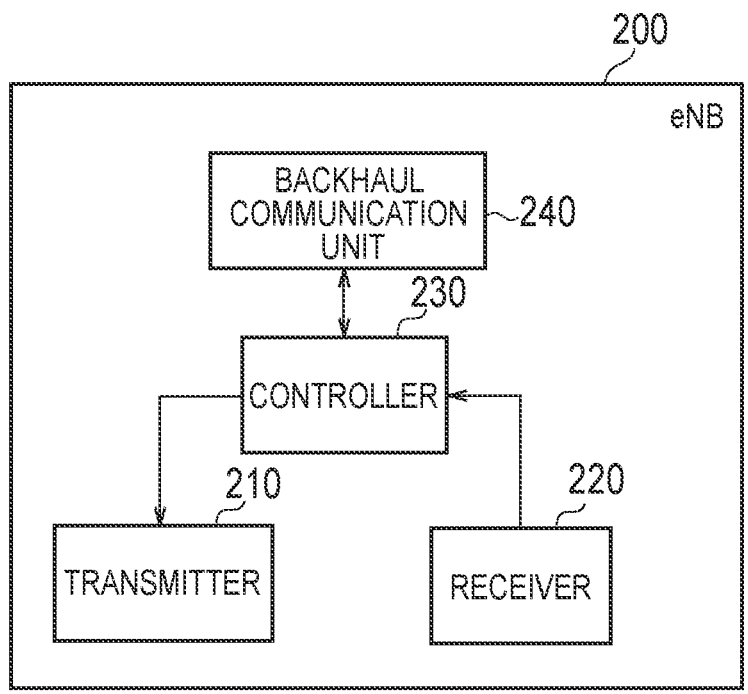
FIG. 5 is a block diagram of an eNB according to the first to fourth embodiments.

FIG. 5 is a block diagram of an eNB 200 (base station). As illustrated in FIG. 5, the eNB 200 includes a transmitter 210, a receiver 220, a controller 230, and a backhaul communication unit 240.

The transmitter 210 transmits various kinds of transmissions under the control of the controller 230. The transmitter 210 includes an antenna and a transmitting device. The transmitting device converts a baseband signal (a transmission signal) output from the controller 130 into a radio signal and transmits the radio signal from the antenna.

The receiver 220 receives various kinds of receptions under the control of the controller 230. The receiver 220 includes an antenna and a receiving device. The receiving device converts a radio signal received by the antenna into a baseband signal (reception signal) and outputs the baseband signal to the controller 230.

The controller 230 controls various kinds of controls in the eNB 200. The controller 230 includes a processor and a memory. The memory stores a program executed by a processor and information used for processes performed by the processor. The processor includes a baseband processor that performs modulation/demodulation, encoding/decoding, and the like of the baseband signal and a central processing unit (CPU) that executes a program stored in the memory and performs various kinds of processes. The processor executes various kinds of processes to be described later and various kinds of communication protocols described above.

The backhaul communication unit 240 is connected to the neighbor eNB 200 via the X2 interface and connected to the MME/S-GW 300 via the S1 interface. The backhaul communication unit 240 is used for communication performed via the X2 interface, communication to be performed via the S1 interface, and the like.

(Unicast Transmission)

In the LTE system, the unicast (point to point (PTP)) transmission is commonly applied to the downlink between the UE 100 and the eNB 200. In the downlink unicast transmission, the eNB 200 controls transmission of the downlink data to the UE 100 on the basis of the feedback information transmitted from the UE 100. The UE 100 transmits the feedback information related to the downlink to the eNB 200. The feedback information is the delivery confirmation information (ACK/NACK) and the channel state information (CSI).

In the downlink, the eNB 200 transmits a downlink control signal (downlink control information (DCI)) to the UE 100 using a PDCCH, and transmits a downlink control signal and/or downlink data to the UE 100 using a PDSCH. The downlink control signal carried through the PDCCH includes uplink scheduling information (SI), downlink SI, and a TPC bit. The uplink SI is scheduling information related to an allocation of uplink radio resources, and downlink SI is scheduling information related to an allocation of downlink radio resources. The TPC bit is information for giving an instruction to increase or decrease uplink transmission power. In order to identify a UE 100 of a transmission destination of the downlink control signal, the eNB 200 includes a CRC bit scrambled with an identifier (radio network temporary ID (RNTI)) of the UE 100 of the transmission destination. Each UE 100 descrambles the CRC bits with the RNTI of its own UE for the downlink control signal that is possibly destined for its own UE, performs blind decoding on the PDCCH, and detects the downlink control signal destined for its own UE. The PDSCH carries data through downlink radio resources (resource blocks) indicated by the downlink SI.

In the uplink, the UE 100 transmits an uplink control signal to the eNB 200 using a PUCCH, and transmits an uplink control signal and/or uplink data to the eNB 200 using a PUSCH. The uplink control signal carried through the PUCCH includes a channel quality indicator (CQI), a precoding matrix indicator (PMI), a rank indicator (RI), a scheduling request (SR), and an ACK/NACK. The CQI is an index value indicating a downlink channel quality and used for decision of an MCS to be used for downlink transmission and the like. The PMI is an index value indicating a precoder matrix which is desirable to be used for downlink transmission. The RI is an index value indicating the number of layers (the number of streams) which can be used for downlink transmission. The CQI, the PMI, and the RI are information obtained by the UE 100 performing channel estimation using a downlink reference signal and are the channel state information (CSI) indicating the downlink channel state. The SR is information requesting an allocation of uplink radio resources (resource block). The ACK/NACK is delivery confirmation information indicating whether or not the downlink data has been correctly received. The PUSCH mainly carries the uplink data but can also be used for carrying the uplink control signal.

(Multicast/Broadcast Transmission)

In the LTE system, the MBMS is specified in order to implement multicast/broadcast transmission.

In the MBMS, a plurality of cells transmit multicast/broadcast data using a special downlink subframe called an MBSFN subframe. Specifically, a plurality of cells belonging to the same MBSFN area transmit the same multicast/broadcast data. The UE 100 receives the multicast/broadcast data transmitted from a plurality of cells.

In the MBMS mechanism, the MBSFN subframe is used for the MBMS, and the MBSFN subframe is unable to be changed dynamically. Therefore, in the MBMS, radio resources are wasted.

Figure 6:
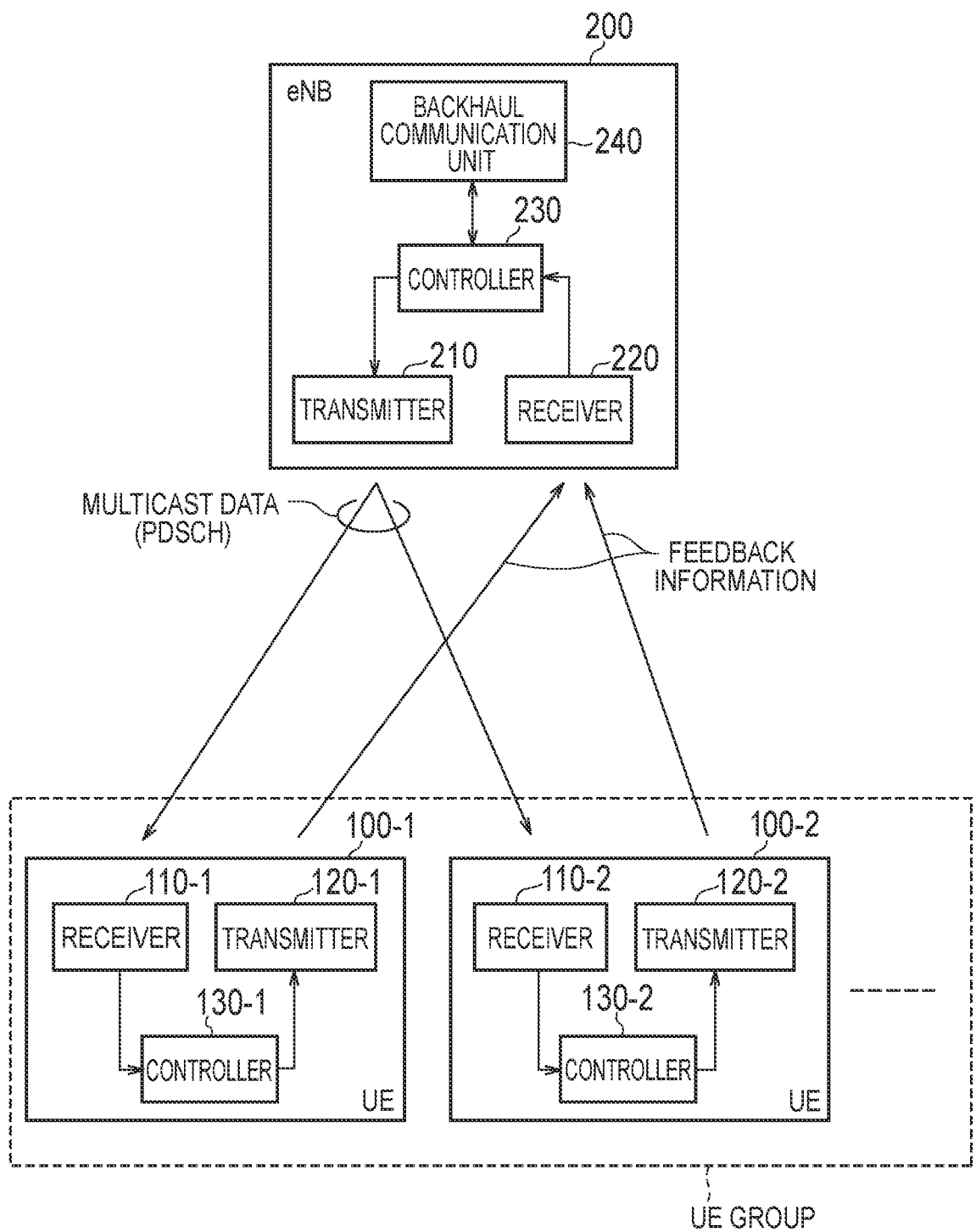
FIG. 6 is a diagram for describing an SC-PTM-related operation according to the first to fourth embodiments.

Meanwhile, introduction of single cell PTM transmission (SC-PTM) is under review in order to implement multicast transmission while increasing the use efficiency of radio resources. FIG. 6 is a diagram for describing an SC-PTM-related operation according to a first embodiment.

As illustrated in FIG. 6, in the SC-PTM, the eNB 200 transmits multicast data by a single cell using the PDSCH. In other words, unlike the MBMS to which the multicast/broadcast transmission in MBSFN area units is applied, multicast/broadcast transmission in cell units is applied to the SC-PTM. A plurality of UEs 100 (a UE 100-1, a UE 100-2, . . . ) that receive the same multicast data constitute a UE group. A common group identifier (for example, a group RNTI) is allocated to each of the UEs 100 in the UE group. The group identifier is allocated by the eNB 200 (or MCE). Alternatively, the group identifier may be allocated by an entity of the core network (EPC 20). Alternatively, the group identifier may be allocated by an application server (for example, a GGS AS).

The eNB 200 transmits the same downlink control signal (the downlink SI or the like) and the downlink data (multicast data) to the UEs 100 constituting the UE group using the group identifier. For example, the eNB 200 includes the CRC bit scrambled with the group identifier in the downlink control signal, and transmits the resulting downlink control signal through the PDCCH. Further, the eNB 200 transmits the multicast data through the PDSCH using the downlink radio resources (at least one resource blocks) indicated by the downlink SI.

Each UE 100 descrambles the CRC bit with the group identifier, performs blind decoding on the PDCCH, and detects the downlink control signal destined for the UE group to which the UE 100 belongs. Then, each UE 100 receives the multicast data using the downlink radio resources (resource blocks) indicated by the PDCCH (the downlink control signal).

Such an SC-PTM mechanism can allocate resources in units of resource blocks in the PDSCH. For this reason, the multicast data can be transmitted and received using minimum necessary radio resources, and the allocated radio resources can be changed dynamically or quasi-statically. Therefore, in the SC-PTM, radio resources are less wasted than in the MBMS.

(Operation of UE 100)

Next, an operation of the UE 100 when feedback is introduced into the SC-PTM will be described. Specifically, an operation between the eNB 200 and one UE 100 (for example, the UE 100-1) included in the UE group will be described with reference to FIG. 6.

The receiver 110 of the UE 100 receives the multicast data transmitted from the eNB 200 to a plurality of UEs 100 using the same downlink radio resources as illustrated in FIG. 6. The same downlink radio resources are at least one resource blocks included in the PDSCH. As described above, a plurality of UEs 100 constitute the UE group to which the same group identifier is allocated.

When a radio state between the eNB 200 and the UE 100 is worse than a threshold value, the transmitter 120 of the UE 100 transmits feedback information related to the downlink to the eNB 200. For example, the radio state is a reception power (RSRP) and/or reception quality (RSRQ) of the downlink reference signal received from the eNB 200 by the receiver 110. Alternatively, the radio state may be a reference signal reception power and/or a reference signal reception quality in resources allocated in the SC-PTM. Alternatively, when a band is divided into predetermined subbands, the radio state may be the lowest value among reference signal reception powers obtained for the subbands or the lowest value among reference signal reception qualities. A condition for transmitting the feedback information to the eNB 200 may be a condition in which various radio states are combined. The condition may be an AND condition or an OR condition. As an example of the AND condition, when the radio state in resources allocated in the SC-PTM is worse than a first threshold value, and the lowest value among the radio states obtained for the subbands is worse than a second threshold value, the feedback information may be transmitted to the eNB 200.

Further, the "radio state is worse than the threshold value" means that when the radio state is the RSRP/RSRQ, the RSRP/RSRQ is lower than the threshold value. However, the "radio state is worse than the threshold value" means that when the radio state is the interference level, the noise level, or the error rate, the interference level/noise level/error rate is higher than the threshold value.

On the other hand, the "radio state is better than the threshold value" means that when the radio state is the RSRP/RSRQ, the RSRP/RSRQ is higher than the threshold value. However, the "radio state is better than the threshold value" means that when the radio state is the interference level, the noise level, or the error rate, the interference level/noise level/error rate is lower than the threshold value.

The radio state is measured by the controller 130. The feedback information related to the downlink is the delivery confirmation information (ACK/NACK) and the channel state information (CSI) and is generated by the controller 130. Here, the feedback information is assumed to be mainly the delivery confirmation information (ACK/NACK).

The controller 130 of the UE 100 suspends transmission of the feedback information when the radio state is better than the threshold value.

As described above, the UE 100 suspends transmission of the feedback information when its own radio state is satisfactory. In other words, the UE 100 transmits the feedback information to the eNB 200 only when its own radio state is not satisfactory.

When the radio state of the UE 100 is satisfactory, the ACK is likely to be transmitted as the delivery confirmation information, and thus the necessity of retransmission of the multicast data is low. Further, since the eNB 200 transmits the multicast data, adaptively to the UE 100 having the poor radio state, the necessity of link adaptation is low when the radio state of the UE 100 is satisfactory. Therefore, since the feedback information is not transmitted from the UE 100 having the satisfactory radio state, it is possible to save the uplink radio resources (for example, PUCCH resources) associated with the feedback.

The receiver 110 of the UE 100 receives configuration information for setting a threshold value from the eNB 200. The controller 130 sets the threshold value on the basis of the configuration information. As described above, since the threshold value can be controlled by the eNB 200, it is possible to adjust the amount of uplink radio resources necessary for the feedback in accordance with a situation of the eNB 200 (an uplink load state or the like).

Here, the configuration information of the threshold value may be broadcast from the eNB 200 through system information (SIB) or may be unicast from the eNB 200 through an individual RRC message. Alternatively, the configuration information of the threshold value may be transmitted through the DCI in which the CRC is scrambled with the group RNTI. The configuration information of the threshold value may be information directly indicating the threshold value or information indicating a relative value (an offset value) of the threshold value with respect to a reference value.

The controller 130 of the UE 100 may transmit first information for requesting an allocation of the uplink radio resources to be used for transmission of the feedback information to the eNB 200 when the radio state becomes worse than the threshold value. For example, the first information is a scheduling request (SR). Alternatively, the first information may be a random access preamble. Alternatively, the first information may be an RRC message (an allocation request). Further, the controller 130 of the UE 100 may transmit second information for requesting release of the uplink radio resources to the eNB 200 when the radio state becomes better than the threshold value. Accordingly, it is possible to save the uplink radio resources associated with the feedback compared with a case in which the feedback resources are constantly allocated. Alternatively, the controller 130 may transmit information indicating that the radio state has become better than the threshold value to the eNB 200 when the radio state become better than the threshold value. In this case, determination about whether or not the uplink radio resources are released is performed by the eNB 200.

(Operation of eNB 200)

Next, an operation of the eNB 200 when the feedback is introduced into the SC-PTM will be described. Specifically, an operation between the eNB 200 and one UE 100 (for example, UE 100-1) included in the UE group will be described with reference to FIG. 6.

The transmitter 210 of the eNB 200 transmits the multicast data to a plurality of UEs 100 (the UE group) using the same downlink radio resources as illustrated in FIG. 6. The receiver 220 of the eNB 200 receives the feedback information related to the downlink only from a specific UE 100 among a plurality of UEs 100. The specific UE 100 is a UE 100 whose radio state with its own eNB 200 is worse than the threshold value. The controller 230 of the eNB 200 controls transmission of the multicast data on the basis of the feedback information.

As described above, since the feedback information is received only from the UE 100 whose radio state is not satisfactory, the uplink radio resources (for example, the PUCCH resources) associated with the feedback can be saved.

The transmitter 210 of the eNB 200 transmits the configuration information for setting the threshold value to a plurality of UEs 100. As described above, since the threshold value can be controlled by the eNB 200, it is possible to adjust the amount of the uplink radio resources necessary for the feedback in accordance with a situation of the eNB 200 (the uplink load state or the like). As described above, the configuration information of the threshold value may be broadcast from the eNB 200 through the system information (SIB), may be unicast the eNB 200 through an individual RRC message, or may be transmitted through the DCI in which the CRC is scrambled with the group RNTI.

The receiver 220 of the eNB 200 receives the first information for requesting the allocation of the uplink radio resources to be used for transmission of the feedback information from the specific UE 100. In response to the reception of the first information, the controller 230 of the eNB 200 allocates the uplink radio resources to the specific UE 100. Further, the receiver 220 of the eNB 200 receives the second information for requesting the release of the uplink radio resources from the specific UE 100. In response to the reception of the second information, the controller 230 releases the uplink radio resources. Accordingly, it is possible to save the uplink radio resources associated with the feedback compared with a case in which the feedback resources are constantly allocated. Alternatively, the receiver 220 may receive the information indicating that the radio state becomes better than the threshold value from the specific UE 100.

The receiver 220 of the eNB 200 may receive a plurality of pieces of feedback information from a plurality of specific UEs 100. In this case, the controller 230 of the eNB 200 selects the specific UE 100 with the worst radio state among a plurality of specific UEs 100 on the basis of the plurality of pieces of feedback information, and controls the transmission of the multicast data in accordance with the feedback information of the selected specific UE 100. Specifically, the controller 230 of the eNB 200 controls, for example, retransmission, link adaptation, transmission diversity/the number of MIMO streams, a transmission power, or the like in accordance with the worst condition.

When there is a UE 100 which indicates reception NG (a UE 100 that transmits NACK) although such transmission control is performed, the controller 230 of the eNB 200 may performs retransmission of an ARQ or a HARQ to the UE 100 in the uncast manner. Alternatively, switching from the multicast transmission to the unicast transmission may be performed.

(Example of Operation Sequence)

Figure 7:
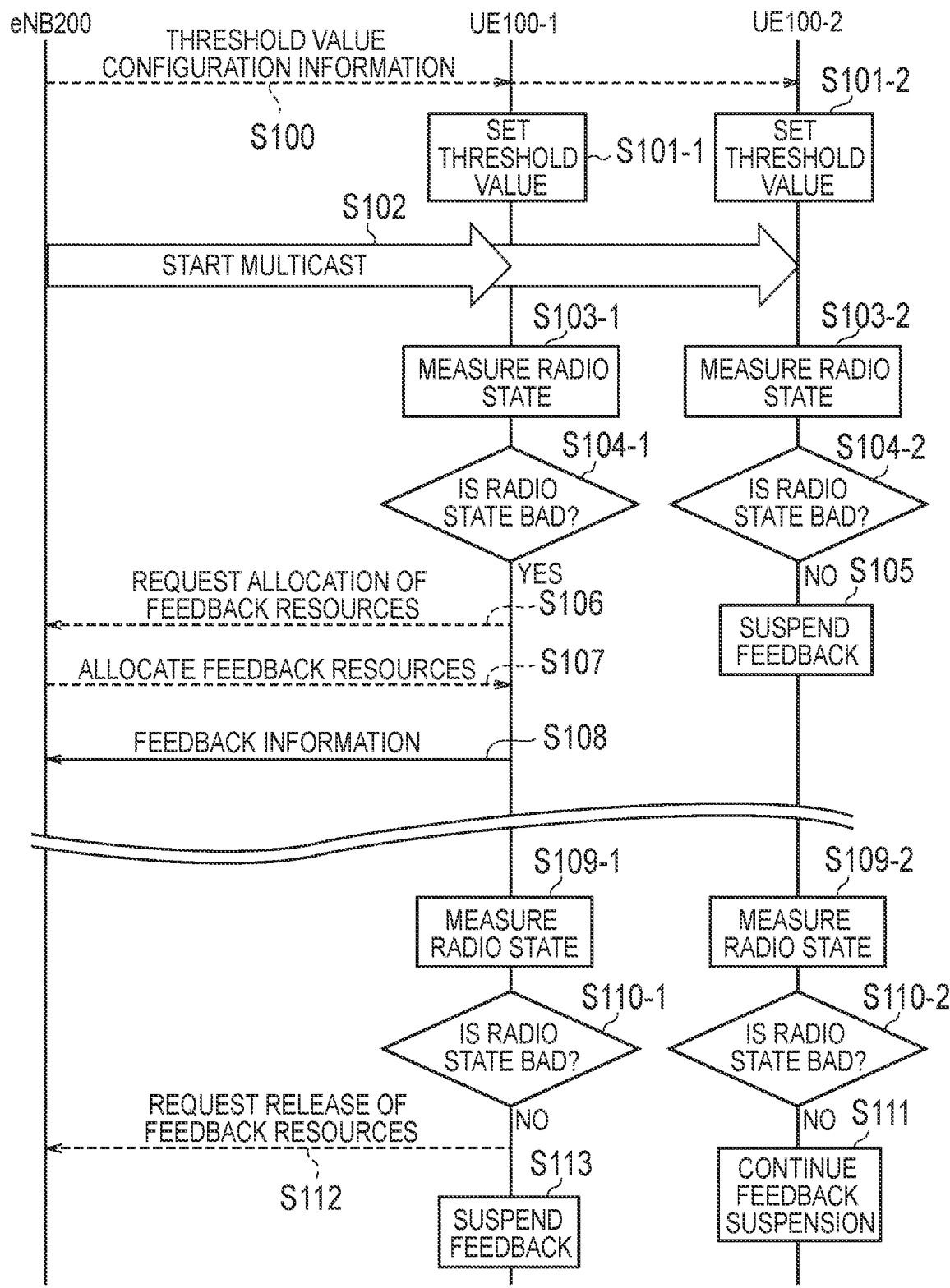
FIG. 7 is a diagram illustrating an example of an operation sequence according to the first embodiment.

An example of an operation sequence according to the first embodiment will be described below. FIG. 7 is a diagram illustrating an example of an operation sequence according to the first embodiment. In FIG. 7, signaling indicated by a broken line is not indispensable and may be omitted.

As illustrated in FIG. 7, in step S100, the eNB 200 transmits the configuration information for setting the threshold value to a plurality of UEs 100.

In step S101, the UE 100 (the UE 100-1 and the UE 100-2) that has received the configuration information sets the threshold value on the basis of the configuration information.

In step S102, the eNB 200 starts the multicast transmission according to the SC-PTM.

In step S103, the UE 100 (the UE 100-1 and the UE 100-2) measures the radio state. As described above, for example, the radio state is the RSRP and/or the RSRQ.

In step S104, the UE 100 (the UE 100-1 and the UE 100-2) compares the radio state with the threshold value. Here, the radio state of the UE 100-1 is assumed to be worse than the threshold value, and the radio state of the UE 100-2 is assumed to be better than the threshold value.

In step S105, the UE 100-2 suspends transmission of the feedback information to the eNB 200.

On the other hand, in step S106, the UE 100-1 transmits the first information (the allocation request) for requesting the allocation of the uplink radio resources (feedback resources) to be used for transmission of the feedback information to the eNB 200.

In step S107, the eNB 200 allocates the feedback resources to the UE 100-1 in response to the reception of the first information from the UE 100-1.

In step S108, the UE 100-1 transmits the feedback information related to the downlink to the eNB 200 using the feedback resources.

Thereafter, in step S109, the UE 100 (the UE 100-1 and the UE 100-2) measures the radio state.

In step S110, the UE 100 (the UE 100-1 and the UE 100-2) compares the radio state with the threshold value. Here, the radio state of the UE 100-1 is assumed to be better than the threshold value, and the radio state of the UE 100-2 is assumed to be better than the threshold value.

In step S111, the UE 100-2 continues the transmission suspension of the feedback information to the eNB 200.

On the other hand, in step S112, the UE 100-1 transmits the second information for requesting the release of the feedback resources to the eNB 200. In response to the reception of the second information, the eNB 200 releases the feedback resources of the UE 100-1.

In step S113, the UE 100-1 suspends the transmission of the feedback information to the eNB 200.

Conclusion of First Embodiment

As described above, in the SC-PTM, since the UE 100 having the satisfactory radio state does not transmit the feedback information, the uplink radio resources (for example, the PUCCH resources) associated with the feedback can be saved. Particularly, even when the eNB 200 performs the multicast transmission to a plurality of UEs 100, the feedback control does not become complicated, and the uplink radio resources can be prevented from being tight. Therefore, it is possible to perform the efficient feedback in the SC-PTM.

Modified Example of First Embodiment

It may be switched whether or not the operation of the first embodiment is enabled in accordance with the uplink load state.

In the modified example of the first embodiment, the controller 230 of the eNB 200 determines whether or not switching from a first mode in which the feedback information is received from the specific UE 100 to a second mode in which the feedback information is received from all of a plurality of UEs 100 is performed on the basis of a parameter associated with the uplink load state. Here, the parameter associated with the uplink load state is, for example, the number of UEs in the group, the number of UEs in all groups, a total of the number of (connected) UEs in the cell, or the like. When the parameter is less than a certain value, the uplink load is determined to be low, and switching from the first mode (the operation of the first embodiment) to the second mode (a mode similar to unicast transmission, that is, a mode in which feedback is given from all UEs in the group) is determined to be performed. Then, the eNB 200 notifies a plurality of UEs 100 of a determination result.

In response to the notification given from the eNB 200, the controller 130 of the UE 100 performs switching from the first mode in which the transmission suspension of the feedback information is enabled to the second mode in which the transmission suspension of the feedback information is disabled.

Here, the switching from the first mode to the second mode has been described, but switching from the second mode to the first mode is also possible. Specifically, when the parameter associated with the uplink load state is a certain value or more, the eNB 200 determines the uplink load to be high, determines that the switching from the second mode to the first mode is performed, and notifies a plurality of UEs 100 of the determination result.

Second Embodiment

A second embodiment will be described focusing on a difference with the first embodiment. The second embodiment is similar to the first embodiment in that the feedback is introduced into the SC-PTM. However, the second embodiment differs from the first embodiment in a scheme of allocating the feedback resources.

(Operation of UE 100)

Next, an operation of the UE 100 according to the second embodiment will be described. Specifically, an operation between the eNB 200 and one UE 100 (for example, the UE 100-1) included in the UE group will be described with reference to FIG. 6.

The receiver 110 of the UE 100 receives the multicast data transmitted from the eNB 200 to a plurality of UEs 100 using the same downlink radio resources as illustrated in FIG. 6. The controller 130 selects the feedback resources from a feedback resource pool. The feedback resource pool is a resource pool allocated from the eNB 200 to a group (the UE group) including a plurality of UEs 100. The feedback resources are uplink radio resources used for transmission of the feedback information. The transmitter 120 transmits the feedback information to the eNB 200 using the selected feedback resources.

Figure 8:
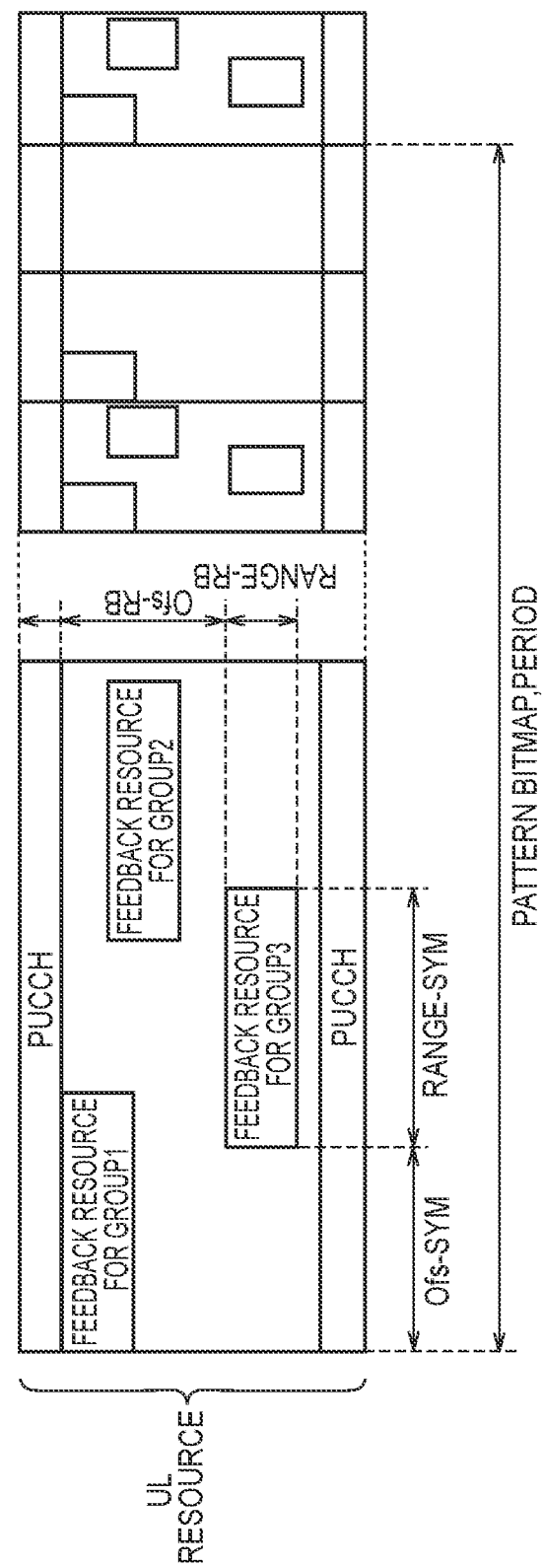
FIG. 8 is a diagram illustrating an example of a feedback resource pool according to the second embodiment.

FIG. 8 is a diagram illustrating an example of the feedback resource pool.

The feedback resource pool is some of all the uplink radio resources as illustrated in FIG. 8.

The feedback resource pool includes uplink radio resources different from the physical uplink control channel (PUCCH) which is individually allocated from the eNB 200 to each of the UEs 100. In other words, the feedback resource pool is arranged on the inside further than both ends of an uplink frequency band.

Further, the feedback resource pool is allocated for each UE group. For example, the feedback resource pool is associated with the group identifier. In the example of FIG. 8, three feedback resource pools corresponding to three UE groups (groups 1 to 3) are arranged in predetermined time resources (one subframe or one radio resource).

Since the feedback resource pool is allocated for each UE group as described above, it is possible to reduce signaling (transmission of scheduling information) associated with the allocation as compared with a case in which the eNB 200 allocates the feedback resources each time. Further, the UE 100 in the UE group is guaranteed to transmit the feedback information in the feedback resource pool, the feedback control is not complicated, and it is possible to prevent the uplink radio resources from being tight.

The receiver 110 of the UE 100 receives the configuration information related to the feedback resource pool from the eNB 200. As illustrated in FIG. 8, the configuration information related to the feedback resource pool (the group 3) includes at least one of a difference (Ofs-sym) between a reference point (a 0-th symbol) on a time axis and a start point of the feedback resource pool, a difference (Ofs-RB) between a reference point (a 0-th RB or a PUCCH resource end) on a frequency axis and a start point of the feedback resource pool, a range (Range-sym) of the feedback resource pool on the time axis, and a range (Range-RB) of the feedback resource pool on the frequency axis.

Here, the parameters (Ofs-sym and Range-sym) on the time axis are indicated in units of symbols, in units of slots, in units of subframes, or in units of radio frames. The parameters (Ofs-RB and Range-RB) on the frequency axis are indicated in units of subcarriers or in units of resource blocks (RBs). Further, the parameters may be specified for each frequency band. Alternatively, the parameters may be specified in units of subbands which are frequency units including a predetermined number of RBs.

Further, the configuration information related to the feedback resource pool may include an "ON/OFF pattern" and a "cycle." The ON/OFF pattern is a parameter indicating the presence or absence of certain feedback resources for each subframe or each slot. The cycle is a parameter indicating a cycle of the ON/OFF pattern.

Generation and transmission of the feedback information for a reception signal (received prior to four subframes) corresponding to a timing (an OFF timing) at which there are no feedback resources may be omitted. Further, the feedback information for a reception signal corresponding to a timing (an OFF timing) at which there are no feedback resources may be transmitted collectively at a next timing (an ON timing) at which there are the feedback resources. For example, when both subframes n and n+1 are successfully received, the ACK is transmitted, and when reception of one or more subframes fails, the NACK is transmitted (fed back) to the eNB 200 at a timing of a 4-th subframe after the subframe (n+1).

The controller 130 of the UE 100 may select the uplink radio resources (the feedback resources) used for transmission of the feedback information from the feedback resource pool on the basis of unique information allocated from the eNB 200 to the UE 100 or unique information which is preconfigured to the UE 100. The resources are selected on the basis of the unique information, and thus the collision of the feedback resources between the UEs in the feedback resources can be prevented.

Here, for example, the unique information allocated from the eNB 200 to the UE 100 is a cell RNTI (C-RNTI). The unique information which is preconfigured to its own UE 100 is an international mobile subscriber identity (IMSI) or an SAE temporary mobile subscriber identity (S-TMSI). The IMSI is unique information stored in the UIM card. The S-TMSI is unique information which is allocated from the MME to the UE 100 when the UE 100 performs location registration in the network.

For example, the controller 130 of the UE 100 selects frequency resources (RB) in a part of the unique information and selects time resources and signal sequence (sequence) in the remaining part of the unique information. Alternatively, the feedback resources may be selected in accordance with a calculation formula such as "unique information mod the number of REs of feedback resource pool."

When a third embodiment to be described later is combined with the second embodiment, the resources selection based on the unique information may be unnecessary.

(Operation of eNB 200)

Next, an operation of the eNB 200 according to the second embodiment will be described. Specifically, an operation between the eNB 200 and one UE 100 (for example, the UE 100-1) included in the UE group will be described with reference to FIG. 6.

The controller 230 of the eNB 200 allocates the feedback resource pool usable for transmission of the feedback information to the group including a plurality of UEs 100 as illustrated in FIG. 6. The transmitter 210 of the eNB 200 transmits the multicast data to a plurality of UEs 100 using the same downlink radio resources. The receiver 220 of the eNB 200 receives the feedback information transmitted from a plurality of UEs 100 using the uplink radio resources selected from the feedback resource pool.

As described above, the feedback resource pool includes the uplink radio resources different from the physical uplink control channel (PUCCH) individually allocated from its own eNB 200 to each of the UEs 100.

The transmitter 210 of the eNB 200 transmits the configuration information related to the feedback resource pool to a plurality of UEs 100. As described above, the configuration information includes at least one of a difference between a reference point on the time axis and a start point of the feedback resource pool, a difference between a reference point on the frequency axis and a start point of the feedback resource pool, a range of the feedback resource pool on the time axis, and a range of the feedback resource pool on the frequency axis. The configuration information may include the "ON/OFF pattern" and the "period."

The configuration information related to the feedback resource pool may be broadcast from the eNB 200 through the system information (SIB), may be unicast from the eNB 200 through an individual RRC message, or may be transmitted through the DCI in which the CRC is scrambled with the group RNTI.

(Example of Operation Sequence)

Figure 9:
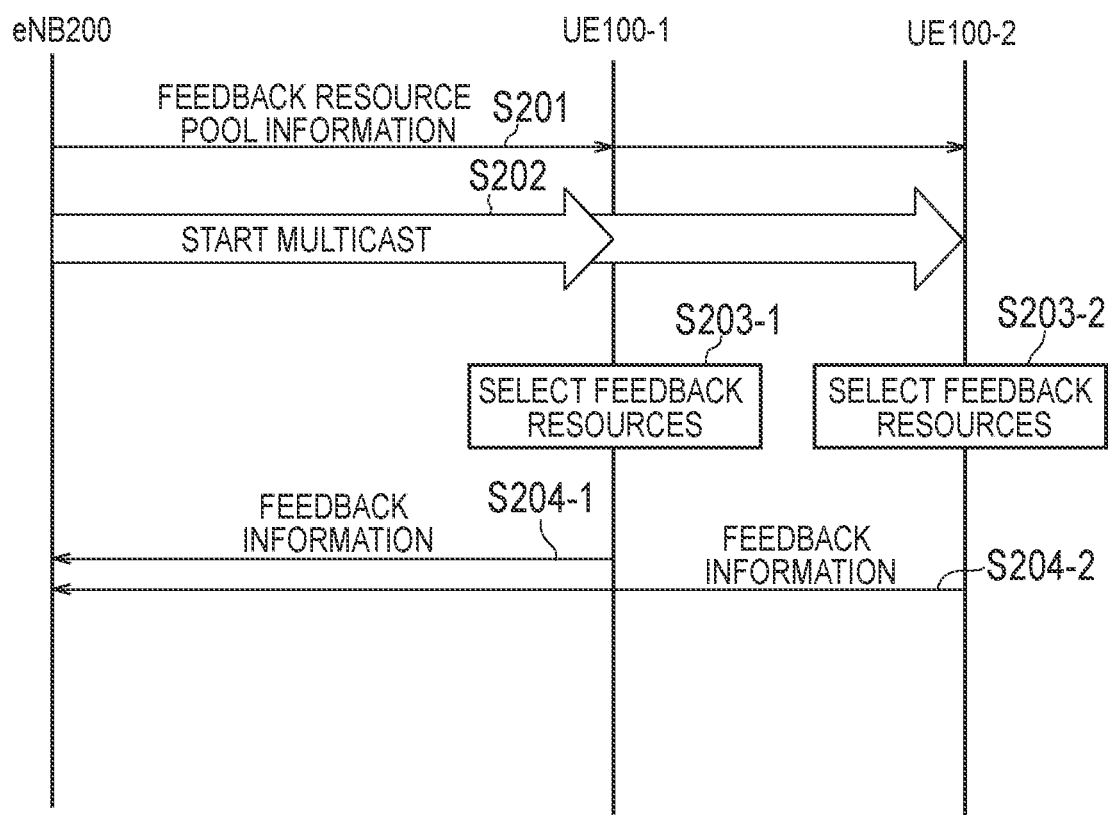
FIG. 9 is a diagram illustrating an example of an operation sequence according to the second embodiment.

An example of an operation sequence according to the second embodiment will be described below. FIG. 9 is a diagram illustrating an example of an operation sequence according to the second embodiment.

As illustrated in FIG. 9, in step S201, the eNB 200 transmits the configuration information related to the feedback resource pool (feedback resource pool information) to the UE 100 (the UE 100-1 and the UE 100-2) included in the group. Each UE 100 receives and stores the feedback resource pool information.

In step S202, the eNB 200 starts multicast transmission according to the SC-PTM.

In step S203, the UE 100 (the UE 100-1 and the UE 100-2) selects the feedback resources from the feedback resource pool allocated to its own group on the basis of the unique information of its own UE.

In step S204, the UE 100 (the UE 100-1 and the UE 100-2) transmits the feedback information to the eNB 200 using the selected feedback resources.

Conclusion of Second Embodiment

Since the feedback resource pool is allocated for each UE group as described above, it is possible to reduce signaling (transmission of scheduling information) associated with the allocation as compared with a case in which the eNB 200 allocates feedback resources each time. Further, the UE 100 in the UE group is guaranteed to transmit the feedback information in the feedback resource pool, the feedback control is not complicated, and it is possible to prevent the uplink radio resources from being tight.

First Modified Example of Second Embodiment

It may be switched whether or not the operation of the second embodiment is enabled in accordance with the uplink load state.

In the modified example of the second embodiment, the controller 230 of the eNB 200 determines whether or not switching from a first mode in which the feedback information is transmitted using the resource pool to a second mode in which the feedback information is transmitted using the physical uplink control channel (PUCCH) individually allocated from the eNB 200 to each of the UEs 100 on the basis of a parameter associated with the uplink load state. The parameter associated with the uplink load state is similar to that in the modified example of the first embodiment. When the parameter is less than a certain value, the uplink load is determined to be low, and switching from the first mode (the operation of the second embodiment) to the second mode (a mode similar to the unicast transmission, that is, a mode in which the feedback is performed using the PUCCH/PUSCH) is determined to be performed. Then, the eNB 200 notifies a plurality of UEs 100 of the determination result.

In response to the notification given from the eNB 200, the controller 130 of the UE 100 performs switching from the first mode in which the feedback information is transmitted using the resource pool to the second mode in which the feedback information is transmitted using the physical uplink control channel (PUCCH) individually allocated from the eNB 200 to each of the UEs 100.

Here, the switching from the first mode to the second mode has been described, but switching from the second mode to the first mode is also possible. Specifically, when the parameter associated with the uplink load state is a certain value or more, the eNB 200 determines the uplink load to be high, determines that the switching from the second mode to the first mode is performed, and notifies a plurality of UEs 100 of the determination result.

Further, threshold value of the radio state may be set for each feedback resource pool. When the measurement result is within a threshold value range, the UE 100 may use the resource pool. Accordingly, it is possible to use the resource pool differently in accordance with the radio state.

Second Modified Example of Second Embodiment

In the second embodiment, it is not particularly mentioned whether UE 100 is in the RRC connected state or the RRC idle state. The present modified example will be described in connection with an example in which the UE 100 is in the RRC idle state.

In the present modified example, in addition to the UE 100 in the RRC connected state, the UE 100 in the RRC idle state can use the resource pool as well. The UE 100 in the RRC idle state transmits the feedback information using the uplink radio resources selected from the resource pool. The feedback information is, for example, the ACK/NACK (HARQ ACK/NACK). However, as will be described in the third embodiment, the feedback information may be only the NACK rather than the ACK/NACK.

In the present modified example, the UE 100 transmits the feedback information in the RRC idle state without performing a timing advance (TA) adjustment. The TA adjustment is control for adjusting a transmission timing of the UE 100 on the basis of a propagation delay between the UE 100 and the eNB 200. The UE 100 in the RRC connected state performs the TA adjustment in accordance with a TA value received from the eNB 200. On the other hand, the UE 100 in the RRC idle state transmits the feedback information without performing the TA adjustment since it is difficult to receive the TA from the eNB 200.

However, it is desirable that a guard region for permitting a transmission error in the frequency direction and/or the time direction be set in the resource pool. The guard region is set outside or inside the resource pool notified from the eNB 200 to the UE 100. When the guard region is set outside the resource pool, a guard region of one RB (the frequency direction) and/or one subframe (the time direction) is set through scheduling implementation performed by the eNB 200. In that case, the eNB 200 does not allocate resources corresponding to the guard region. When the guard region is set inside the resource pool, the use of resources such as several subcarriers, several SC-FDMA symbols, one RB, or one subframe near the resource pool boundary is prohibited as specification requirements. The feedback resource pool may be one in which the guard region is added to the outside of the feedback resources or a collection thereof.

Further, it is difficult to apply the closed loop transmission power control to the UE 100 in the RRC idle state. Therefore, the eNB 200 preferably transmits an open loop transmission power control parameter to be applied to the transmission of the feedback information to the UE 100 as the configuration information related to the resource pool. For example, the eNB 200 includes the open loop transmission power control parameter in a system information block (SIB) to be broadcast. The UE 100 receives the open loop transmission power control parameter and controls the transmission power at the time of transmission of the feedback information on the basis of the open loop transmission power control parameter.

Further, when the open loop transmission power control parameter is applied to the UE 100 in the RRC connected state, the open loop transmission power control parameter may be different between the UE 100 in the RRC connected state and for the UE 100 in the RRC idle state. Since the eNB 200 knows the number of UEs 100 in the RRC connected state, the eNB 200 set the transmission power to be higher (in other words, strict). On the other hand, since the number of UEs 100 in the RRC idle state is not known to the eNB 200, the transmission power is set to be low (in other words, with a margin). Specifically, the eNB 200 sets the transmission power of the UE 100 in the RRC idle state to be lower than that of the UE 100 in the RRC connected state. Alternatively, the eNB 200 may set the transmission power of the UE 100 in the RRC idle state by estimating higher transmission when the number of UEs 100 in the RRC idle state which exists in its own cell is a predetermined number and distributing the transmission power by the predetermined number.

The open loop transmission power control parameter may be set separately from the existing parameters (parameters such as the PRACH, the PUSCH/SRS, and the PUCCH). A transmission power parameter of the PUSCH is used as a part of the transmission power parameter of the SRS. Alternatively, the open loop transmission power control parameter may be specified in a form in which an offset is added to an existing parameter (for example, the PRACH parameter). For the offset, for example, a variable value given through the SIB is used, or a fixed value is specified in the standard.

The eNB 200 may notify UE 100 of the necessity of the transmission of the feedback information in the RRC idle state. The notification may be give through the SIB. The UE 100 transmits the feedback information in the RRC idle state only when the notification indicating the necessity of the transmission of the feedback information in the RRC idle state (that is, indicating that the feedback is necessary) is given from the eNB 200.

Third Modified Example of Second Embodiment

In the second embodiment, the example of allocating the feedback resource pool (hereinafter simply referred to as a "resource pool") for each UE group (G-RNTI) has been described. In the present modified example, an example of subdividing the resource pool in accordance with content of the feedback information will be described.

The feedback information is one of a plurality of index values. When the feedback information is the CQI, in a general CQI feedback, the UE 100 feeds back a CQI selected among a plurality of CQIs corresponding to a plurality of MCSs. When the feedback information is the PMI, in a general PMI feedback, the UE 100 feeds back a PMI selected among a plurality of PMIs corresponding to a plurality of precoders. When the feedback information is the RI, in a general RI feedback, the UE 100 feeds back a RI selected among a plurality of RIs corresponding to a plurality of ranks.

In the third modified example of the second embodiment, a plurality of resource pools corresponding to a plurality of index values are allocated from the eNB 200 to the UE 100. Specifically, the eNB 200 sets a plurality of resource pools, and associates each resource pool with an index value. A correspondence relation between the resource pool and the index value may be a one-to-one correspondence. The eNB 200 associates a resource pool differing according to each MCS, a resource pool differing according to each PMI, and a resource pool differing according to each RI. Alternatively, a correspondence relation between the resource pool and the index value may be a one-to-many correspondence. For example, the eNB 200 may associate a plurality of index values with one resource pool such as MCSs 0 to 5. In the case of the one-to-many correspondence, resources to be expended can be reduced to be smaller than in the case of the one-to-one correspondence.

When transmitting a predetermined index value to the eNB 200 as the feedback information, the UE 100 selects a resource pool corresponding to the predetermined index value among a plurality of resource pools. Then, the UE 100 transmits the predetermined index value to the eNB 200 as the feedback information using the feedback resources included in the selected resource pool.

In the third modified example of the second embodiment, radio resources (resources elements) common to a plurality of UEs 100 and/or a signal sequence (a base sequence or a cyclic shift) common to a plurality of UEs 100 are associated with each of a plurality of resource pools. Here, the "plurality of UEs 100" are UEs 100 included in the same UE group. The UE 100 transmits the feedback information to the eNB 200 using the common radio resources and/or the common signal sequence corresponding to the selected resource pool. As a result, when a plurality of UEs 100 transmit the same index value to the eNB 200, reception by the eNB 200 is performed in a state in which the same index value (the same feedback signal) is combined. The eNB 200 detects the presence or absence of the feedback signal for each resource pool in a power domain. For example, when the eNB 200 detects the feedback signal in one resource pool, eNB 200 determines that the index value corresponding to one resource pool is transmitted from UE 100. A case in which this method is applied to the NACK will be described in the third embodiment.

The notification of the correspondence relation between the resource pool and the feedback value (the index value) may be given from the eNB 200 to the UE 100 through the SIB (or individual signaling or the DCI in which the CRC is scrambled with the group RNTI). Alternatively, the correspondence relation may be defined in advance. A correspondence relation of a plurality of patterns may be defined in advance, and a notification and setting of an identifier designating one pattern may be able to be performed from the eNB 200 to the UE 100.

Further, a notification and setting of the radio resources (time/frequency) of the resource pool and/or the signal sequence (sequence/cyclic shift) of the feedback signal may be able to be performed from the eNB 200 to the UE 100 through the SIB (or individual signaling or the DCI in which the CRC is scrambled with the group RNTI).

Fourth Modified Example of Second Embodiment

In the second embodiment, the example in which the eNB 200 notifies the UE 100 of a resource pool having a predetermined time width and a predetermined frequency width using the configuration information. However, the frequency resources of the resource pool may change (hop) over time. For example, the frequency resources of the resource pool may change between slots. In the present modified example, for example, the resource pool designated by the configuration information may indicate a predetermined pattern (a hopping pattern) in which different frequency resources are combined in different time resources.

Fifth Modified Example of Second Embodiment

In the second embodiment, a case in which the SC-PTM feedback timing collides with the periodic feedback timing (the periodic CSI feedback) in the UE 100 in the RRC connected state is not taken into consideration. When such a collision occurs, the UE 100 gives a priority to transmission of the periodic CSI feedback or the like omits the SC-PTM feedback. Alternatively, when such a collision occurs, the UE 100 supporting simultaneous transmission of the PUCCH and the PUSCH may transmit both the periodic CSI feedback and the SC-PTM feedback.

In the second embodiment, a case in which the SC-PTM feedback timing collides with the PUSCH transmission timing in the UE 100 in the RRC connected state is not taken into consideration. When such a collision occurs, the UE 100 transmits the SC-PTM feedback multiplexed in the PUSCH. Alternatively, when such a collision occurs, the UE 100 supporting simultaneous transmission of the PUCCH and the PUSCH may transmit both the PUSCH and the SC-PTM feedback.

A UE capability related to the simultaneous transmission of the PUCCH and the SC-PTM feedback and a UE capability related to the simultaneous transmission of the PUSCH and the SC-PTM feedback may be defined. The UE 100 notifies the eNB 200 of the UE capabilities and operates on the basis of the UE capabilities.

Third Embodiment

The third embodiment will be described focusing on a difference with the first and second embodiments. The third embodiment is similar to the first and second embodiments in that the feedback is introduced into the SC-PTM. In the third embodiment, the feedback information is assumed to be the delivery confirmation information (ACK/NACK).

(Operation of UE 100)

Next, an operation of the UE 100 according to the third embodiment will be described. Specifically, an operation between the eNB 200 and one UE 100 (for example, the UE 100-1) included in the UE group will be described with reference to FIG. 6.

When downlink unicast transmission is applied, the transmitter 120 of the UE 100 transmits either the positive response (ACK) indicating that the downlink data is correctly received or the negative response (NACK) indicating that reception of the downlink data fails to the eNB 200 as the feedback Information. In other words, when the reception of the downlink data fails, the NACK is transmitted, and when the downlink data is correctly received, the ACK is transmitted.

On the other hand, when the SC-PTM is applied, the controller 130 suspends the transmission of the ACK so that only the NACK out of the ACK and the NACK is transmitted to the eNB 200 as the feedback information. In other words, when the reception of the downlink data (the multicast data) fails, the NACK is transmitted, but even when downlink data (the multicast data) is correctly received, the ACK is not transmitted.

As described above, only the NACK is used as the delivery confirmation information for the SC-PTM, and thus it is possible to save the uplink radio resources (for example, the PUCCH resources) associated with the transmission of the ACK.

Further, when the SC-PTM is applied, the transmitter 120 of the UE 100 transmits the NACK using the radio resources (resources element) and the signal sequence (the base sequence and the cyclic shift) which are common to a plurality of UEs 100 (the UE group) that perform the SC-PTM with the eNB 200. Specifically, the common resources are allocated from the eNB 200 for each UE group, and the UE 100 transmits the NACK using the common resources of the UE group to which the UE 100 belongs.

As a result, the uplink radio resources (for example, the PUCCH resources) associated with the transmission of the NACK can also be saved.

However, the NACK by the common resources is applied, the NACKs of a plurality of UEs 100 are combined, and the eNB 200 is unable to identify a NACK transmission source UE. However, retransmission to each UE 100 in the group is performed in a multicast manner, and thus it is not necessary to identify the UE 100 that has transmitted the NACK.

When the SC-PTM is applied, the transmitter 120 of the UE 100 preferably transmits a demodulation reference signal (DMRS) of the NACK using the radio resources and the signal sequence common to a plurality of UEs 100. Accordingly, the NACK is satisfactorily demodulated in the eNB 200. Further, the "DMRS of the NACK" is a DMRS associated with the NACK and indicates a DMRS different from the NACK. Alternatively, when NACK is included in the DMRS sequence, the "NACK DMRS" indicates a DMRS including the NACK.

(Operation of eNB 200)

Next, an operation of the eNB 200 when the feedback is introduced into the SC-PTM will be described. Specifically, an operation between the eNB 200 and one UE 100 (for example, the UE 100-1) included in the UE group will be described with reference to FIG. 6.

As illustrated in FIG. 6, when downlink unicast transmission is applied, the receiver 220 of the eNB 200 receives either the ACK indicating that the downlink data is correctly received or the NACK indicating that the reception of the downlink data fails from the UE 100 as the feedback information. On the other hand, when the SC-PTM is applied, the receiver 220 of the eNB 200 receives only the NACK out of the ACK and the NACK from the UE 100 as the feedback information.

When the SC-PTM is applied, the controller 230 of the eNB 200 allocates common radio resources and a common signal sequence to a plurality of UEs 100 (UE group) that performs the SC-PTM with its own eNB 200 for transmission of the NACK. Specifically, the common resources are allocated for each UE group. When the SC-PTM is applied, the controller 230 of the eNB 200 preferably allocates common radio resources and common signal sequences to a plurality of UEs 100 for transmission of the demodulation reference signals (DMRS) of the NACK.

(Example of Operation Sequence)

Figure 10:
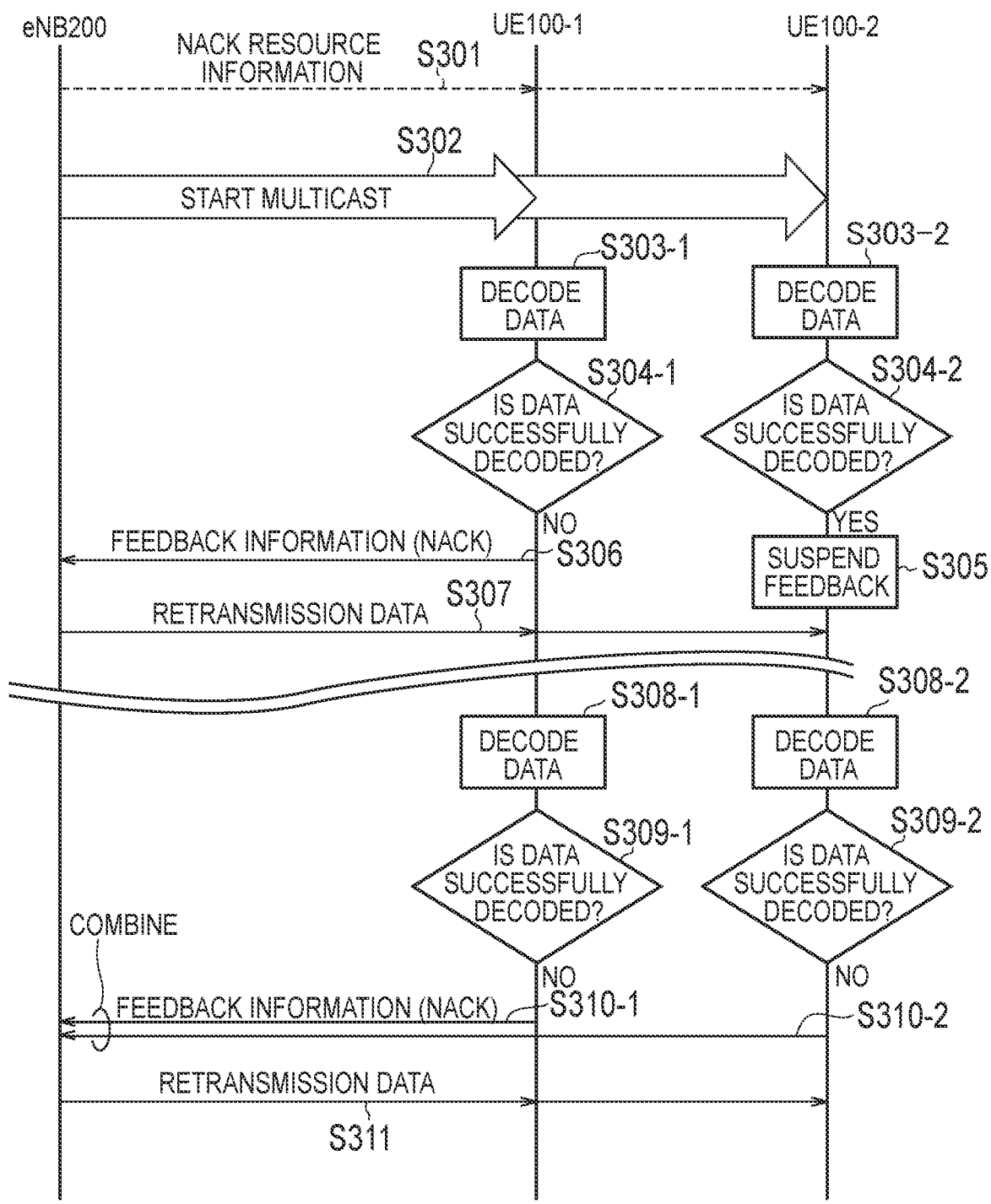
FIG. 10 is a diagram illustrating an example of an operation sequence according to the third embodiment.

An example of an operation sequence according to the third embodiment will be described below. FIG. 10 is a diagram illustrating an example of an operation sequence according to the third embodiment.

As illustrated in FIG. 10, in step S301, the eNB 200 transmits configuration information related to the common resources for NACK transmission to the UE 100 (the UE 100-1 and the UE 100-2) in the group. The configuration information related to the common resources for NACK transmission may be broadcast from the eNB 200 through the system information (SIB) or may be unicast from the eNB 200 through an individual RRC message. Each UE 100 receives and stores the configuration information.

In step S302, the eNB 200 starts multicast transmission according to the SC-PTM.

In step S303, the UE 100 (the UE 100-1 and the UE 100-2) tries to decode the received multicast data.

In step S304, the UE 100 (the UE 100-1 and the UE 100-2) checks whether or not the multicast data is successfully decoded. Here, the UE 100-1 is assumed to fail in decoding, and the UE 100-2 is assumed to succeed in decoding.

In step S305, the UE 100-2 suspends the transmission of the feedback information (NACK) to the eNB 200.

On the other hand, in step S306, the UE 100-1 transmits the NACK to the eNB 200 using the common resources for NACK transmission.

In step S307, the eNB 200 transmits retransmission data to the UE 100 (the UE 100-1 and the UE 100-2) in the group in response to the reception of the NACK.

Thereafter, in step S308, the UE 100 (the UE 100-1 and the UE 100-2) checks whether newly received multicast data is successfully decoded. Here, the UE 100-1 and the UE 100-2 are assumed to fail in decoding (NO in S309).

In step S310, the UE 100-1 and the UE 100-2 transmit the NACK to the eNB 200 using the common resources for NACK transmission. The NACKs are received by the eNB 200 in a combined state.

In step S311, the eNB 200 transmits retransmission data to the UE 100 (the UE 100-1 and the UE 100-2) in the group in response to the reception of the NACK.

Conclusion of Third Embodiment

As described above, the uplink radio resources (for example, the PUCCH resources) associated with ACK transmission can be saved using only the NACK as the delivery confirmation information for the SC-PTM. Further, the NACK is transmitted using the common resources of each UE group, and thus the uplink radio resources associated with NACK transmission can also be saved.

First Modified Example of Third Embodiment

Whether or not to activate the operation of the third embodiment described above may be switched depending on the uplink load state.

In the first modified example of the third embodiment, when the SC-PTM is applied, the controller 230 of the eNB 200 determines whether or not switching from the first mode in which only the NACK is transmitted as the feedback information to the second mode in which either the ACK or the NACK is transmitted as the feedback information is performed on the basis of a parameter related to the uplink load state. The parameter related to the uplink load state is similar to that of the modified example of the first embodiment. When the parameter is less than a certain value, the uplink load is determined to be low, and switching from the first mode (the operation of the third embodiment) to the second mode (a mode similar to the unicast transmission, that is, a mode in which either the ACK or the NACK is transmitted as the feedback information) is determined to be performed. Then, the eNB 200 notifies a plurality of UEs 100 of a determination result.

In response to the notification from the eNB 200, the controller 130 of the UE 100 performs switching from the first mode in which only the NACK is transmitted to the eNB 200 as the feedback information to the second mode in which either the ACK or the NACK is transmitted to the eNB 200 as the feedback information.

Here, the switching from the first mode to the second mode has been described, but switching from the second mode to the first mode is also possible. Specifically, when the parameter associated with the uplink load state is a certain value or more, the eNB 200 determines the uplink load to be high, determines that the switching from the second mode to the first mode is performed, and notifies a plurality of UEs 100 of the determination result.

Second Modified Example of Third Embodiment

In the third embodiment, the link adaptation (in particular, the change of the MCS) has not been mentioned. However, the eNB 200 may implement the link adaptation with no CQI feedback by changing the MCS in response to the reception of the NACK. For example, when the NACK is received, the eNB 200 changes the MCS to a MCS having a higher error tolerance than the MCS used until then. When no NACK is received, the eNB 200 changes the MCS to a MCS having a lower error tolerance than the MCS used until then. Hereinafter, changing to the MCS having a higher error tolerance is referred to as "decreasing the MCS," and changing to the MCS having a lower error tolerance is referred to as "increasing the MCS."

When the eNB 200 increases the MCS in response to no reception of the NACK, the UE 100 which has managed to receive (decode) the multicast data is likely not to receive (decode) subsequent multicast data.

In the second modified example of the third embodiment, the UE 100 further transmits notification information different from the NACK to the eNB 200. The notification information is information indicating that the UE 100 desires a change prohibition of the MCS to be applied to the SC-PTM. Specifically, the UE 100 transmits notification information indicating that the MCS is not desired to be increased to the eNB 200. The UE 100 may transmit notification information indicating that the MCS is not desired to be increased to the eNB 200 when the reception quality of the multicast data is less than a threshold value. The resource pool described above in the second embodiment and the second and third modified examples may be used for transmission of the notification information. Specifically, the eNB 200 gives a notification of the resource pool for notification information to the UE 100 so that the resource pool is set in the UE 100, and the UE 100 transmits the notification information to the eNB 200 using the common radio resources and/or the common signal sequence in the resource pool.

When the notification information indicating that the MCS is not desired to be increased is received from the UE 100, the eNB 200 performs control such that the MCS is not increased. On the other hand, when the notification information indicating that the MCS is not desired to be increased is not received from the UE 100, the eNB 200 may perform control such that the MCS is increased. Alternatively, the notification information may be information indicating that the reception quality of the multicast data is less than a threshold value. In this case, the eNB 200 determines whether or not the MCS is changed.

Alternatively, the notification information may be information indicating that the UE 100 desires to change the MCS. For example, the UE 100 transmits the notification information indicating that the MCS is desired to be increased to the eNB 200 when the reception quality of the multicast data is a threshold value or more. Alternatively, the notification information may be information indicating that the UE 100 permits the change of the MCS.

Alternatively, the notification information may be information indicating that the reception quality of the multicast data is a threshold value or more. In this case, the eNB 200 determines whether or not to the MCS is changed.

In the second modified example of the third embodiment is somewhat not adequate to a case in which the MCS is desired to be decided before communication starts. Therefore, the eNB 200 may apply the third modified example of the second embodiment when the MCS is desired to be decided before communication starts and applies the second modified example of the third embodiment when the MCS is desired to be changed after communication starts.

Fourth Embodiment

Figure 11:
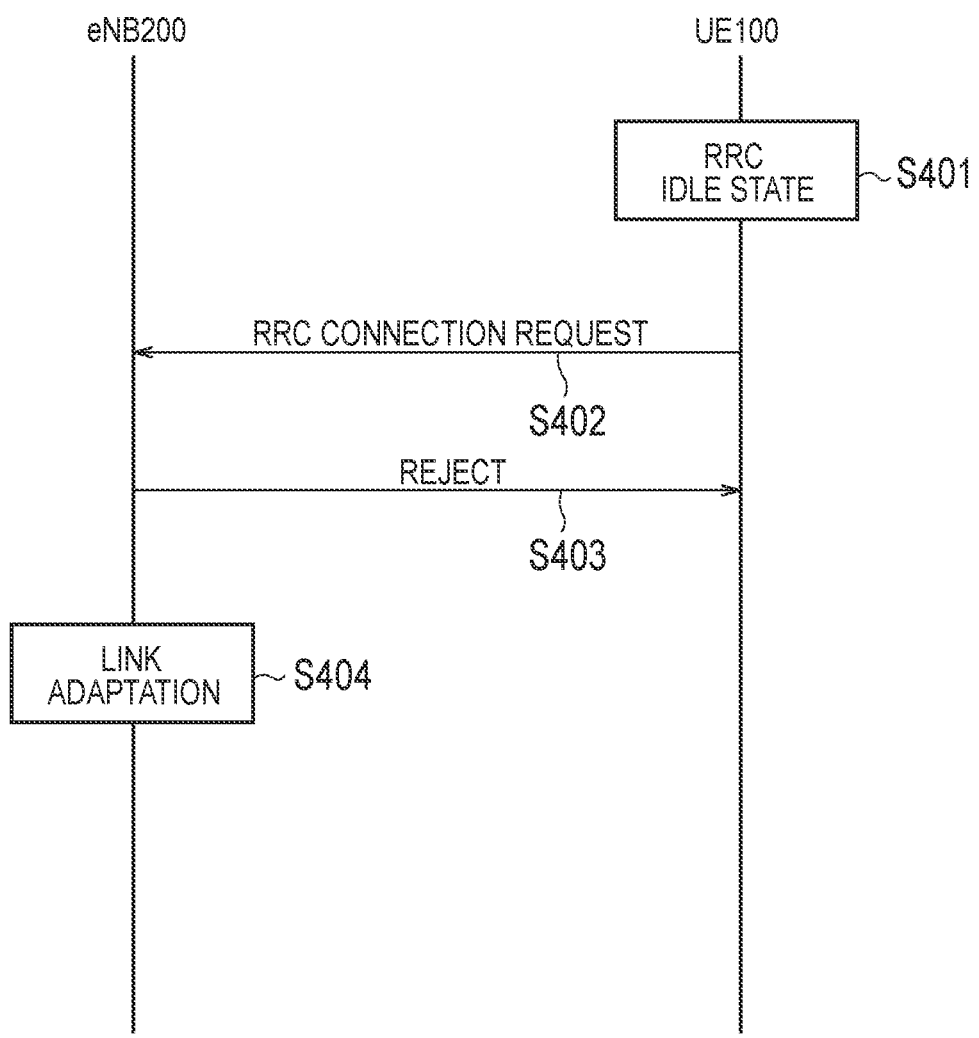
FIG. 11 is a diagram illustrating an example of an operation sequence according to the fourth embodiment.

A fourth embodiment will be described focusing on a difference with the first to third embodiments. In the fourth embodiment, the feedback is assumed to be given by the UE 100 in the RRC idle state. FIG. 11 is a diagram illustrating an example of an operation sequence according to the fourth embodiment.

The UE 100 according to the fourth embodiment receives the multicast data from the eNB 200 in accordance with the SC-PTM in the RRC idle state (step S401). The UE 100 transmits a connection request message (an RRC Connection Request) for transitioning from the RRC idle state to the RRC connected state to the eNB 200 on the basis of the reception state of the multicast data (step S402). For example, the UE 100 transmits the connection request message to the eNB 200 in accordance with degradation in the reception quality of the multicast data.

The UE 100 includes information related to the multicast data in the connection request message. The eNB 200 receives the connection request message including the information related to the multicast data.

The connection request message includes a field (EstablishmentCause) indicating a connection reason. The UE 100 may include the information related to the multicast data in the field indicating the connection reason. For example, the information related to the multicast data includes at least one of information indicating failure of reception of the multicast data (SC-PTM reception failure), information indicating a modulation and coding scheme recommended to be applied to transmission of the multicast data (Desired MCS), temporary mobile group identity (TMGI) information corresponding to the multicast data, a logical channel ID corresponding to the multicast data, and a group RNTI (G-RNTI) corresponding to the multicast data. For example, a list form including two or more pieces of information such as {TMGI, SC-PTM reception failure (true/false), and Desired MCS} may be used.

The eNB 200 transmits a rejection response (Reject) as a response to the connection request message including the information related to the multicast data (step S403). In response to the reception of the rejection response, the UE 100 maintains the RRC idle state.

The eNB 200 acquires the information related to the multicast data from the received connection request message and performs link adaptation of multicast transmission (SC-PTM) on the basis of the acquired information (step S404). For example, the link adaptation is adaptive modulation and/or transmission power control. The eNB 200 may retransmit data that the UE 100 has failed to receive on the basis of the acquired information. Further, the eNB 200 may allocate SC-PTM feedback resources to the UE 100 at the same time as step S403, separately, or in place of step S404.

Other Embodiments

The first to fourth embodiments described above are not limited to a case in which they are separately and independently performed. Two or more of the first to fourth embodiments may be combined and implemented. For example, the feedback of only the NACK according to the third embodiment may be performed using the resource pool according to the second embodiment.

The eNB 200 may give an instruction about a feedback method to be applied among a plurality of feedback methods according to the first to fourth embodiments (and the modified examples thereof) to the UE 100. For example, such an instruction may be given through the SIB.

In the first to fourth embodiments, the example in which the feedback is introduced into the SC-PTM has been described. However, the present disclosure is not limited to the SC-PTM. For example, the present disclosure may be applied when the feedback is introduced into the MBMS.

In the second modified example of the second embodiment, the example in which the transmission power control parameter for feedback information transmission is transmitted from the eNB 200 to the UE 100 through the SIB has been described. Accordingly, the UE 100 in the RRC idle state controls the transmission power at the time of transmission of the feedback information on the basis of the transmission power control parameter received from the eNB 200. However, instead of using the transmission power control parameter, the UE 100 in the RRC idle state may transmit the feedback information at predefined transmission power. Here, the feedback information transmitted at the predefined transmission power includes, for example, the feedback information transmitted using the feedback resource pool (see the second embodiment) and/or the feedback information of only the NACK (see the third embodiment).

Specifically, the UE 100 in the RRC idle state transmits the feedback information at a maximum transmission power of its own UE. Here, the maximum transmission power of the UE is decided in accordance with a UE capability. In detail, it is the maximum transmission power value according to the UE capability (for example, in the case of a circuit configuration capable of transmitting only +10 dBm, its value). However, when the p-max is broadcast from cell through an SIB 1, a p-max value is the maximum transmission power value in the cell. For example, even in the case of a UE capable of transmitting at +31 dBm, when a broadcast p-max value is +15 dBm, +15 dBm is the maximum transmission power value. Furthermore, a UE power class of each band is used as a factor for deciding the maximum transmission power value. For example, most of all bands have a UE power class 3 (+23 dBm), but a class 1 (+31 dBm) is allowed for only a band 14.

Alternatively, the UE 100 in the RRC idle state transmits the feedback information at an initial transmission power of the RACH. The initial transmission power of the RACH may be a first transmission power of a random access preamble. Commonly, the transmission power of the RACH (random access preamble) is decided by a formula "preambleInitialReceived TargetPower+DELTA_PREAMBLE+ (PREAMBLE_TRANSMISSION_COUNTER−1)*powerRampingStep." Here, preambleInitialReceivedTargetPower corresponds to the initial transmission power of the RACH. preambleInitialReceivedTargetPower is a parameter notified through an SIB 2. Alternatively, "preambleInitialReceivedTargetPower+DELTA_PREAMBLE" may be regarded as the initial transmission power of the RACH. Normal DELTA_PREAMBLE is a (fixed) offset value of each preamble format. However, new DELTA_PREAMBLE may be introduced for the feedback. The new DELTA_PREAMBLE may be set (or broadcast) from the eNB 200 to the UE 100. The new DELTA_PREAMBLE may be set for each type of feedback. For example, since the ACK/NACK is important, a value is set so that higher transmission power is set. On the other hand, a slightly lower transmission power may be set for the CSI feedback in view of interference or the like.

In the second modified example of the second embodiment, the example in which the eNB 200 notifies (broadcasts) the UE 100 of the necessity of the transmission of the feedback information in the RRC idle state through the SIB. Accordingly, the UE 100 (particularly, the UE 100 in the RRC idle state) enables the transmission of the feedback information only when a notification indicating that the feedback is necessary is given from the eNB 200. A specific example of such notification will be described below.

The eNB 200 transmits permission information indicating the transmission permission of the feedback information according to the embodiment (hereinafter referred to simply as "permission information") and configuration information related to the transmission resources of the feedback information (hereinafter referred to simply as "configuration information"). When a notification of the permission information is given from a serving cell, the UE 100 can perform the feedback according to the embodiment. Alternatively, the permission information may be unnecessary. In this case, the UE 100 may determine that permission is implicitly given when a notification of the configuration information is given.

The configuration information includes, for example, the configuration information of the feedback resource pool according to the second embodiment and/or the common resources (the radio resources and the signal sequence) for NACK transmission according to the third embodiment. The UE 100 may acquire the configuration information to be broadcast from the serving cell in advance and apply the configuration information when the permission information is broadcast from the serving cell. In other words, the UE 100 that has acquired the configuration information does not apply the configuration information when the permission information is not broadcast. A criterion for determining whether or not the configuration information is applied may include a feedback capability of the UE 100 and the interest in SC-PTM reception of the UE 100 in addition to the permission information. The UE 100 applies the configuration information only when it has the feedback capability according to the embodiment. Further, the UE 100 applies the configuration information only when its own UE has an interest in SC-PTM reception. The UE 100 having no feedback capability according to the embodiment and the UE 100 having no interest in SC-PTM reception may transition from the RRC idle state to the RRC connected state and may perform unicast reception.

The eNB 200 gives the notification of the permission information and/or the configuration information through an SIB 20 or a single-cell multicast control channel (SC-MCCH). Here, the SIB 20 is an SIB for the SC-PTM. The SC-MCCH is a control channel for the SC-PTM and is a logical channel mapped to a DL-SCH (PDSCH). However, the SC-MCCH has a shorter setup time than the SIB 20 since it is possible to notify of a setting of each TMGI (G-RNTI). Therefore, it is desirable that the eNB 200 transmit the permission information and/or the configuration information through the SC-MCCH rather than the SIB 20. When the notification is given through the SC-MCCH, the eNB 200 may set the feedback scheme for each TMGI (G-RNTI). The eNB 200 may notify the UE 100 of the permission information through the PDCCH at the time of SC-PTM transmission. In this case, for transmission of the permission information, a new DCI format may be applied, or a new bit may be added to an existing DCI format. Further, various kinds of information described in the first to third embodiments may also be notified of through the SC-MCCH.

In the first to fourth embodiments, the LTE system has been described as an example of the mobile communication system. However, the present disclosure is not limited to the LTE system. The present disclosure may be applied to systems other than the LTE system.

APPENDIX

Below, additional explanations about the aforementioned embodiments are described.
(Introduction)
In RAN2#89-bis, the IDLE mode reception of SC-PTM was agreed to be supported.

(Agreements)
1. We intend to support SC-PTM reception by UEs in IDLE and will investigate related aspects such as service continuity.

In RAN1#80-bis, the LS reply on PHY aspects for SC-PTM transmission was agreed and it implies to have HARQ-only or HARQ/CSI feedback for SC-PTM transmission as follows.

Answer: RAN1 has only considered the case where CSI and HARQ or HARQ only feedback is provided by all UEs receiving SC-PTM and all UEs receiving SC-PTM are in RRC_CONNECTED state. CSI and/or HARQ-ACK feedback can bring gain in the considered case. If the group of UEs receiving SC-PTM consist of UEs in both RRC_IDLE and RRC_CONNECTED states, the link adaptation and/or retransmissions based on CSI and/or HARQ feedback may not be applicable. [ . . . ]

In this appendix, the possible link adaptation mechanisms for SC-PTM transmission are considered for both UEs in connected and idle.

(Discussion)
Link Adaptation in RRC Connected Mode
In addition to the LS from RAN1, RAN2#89-bis held the discussion on resource efficiency based on evaluations [3][4][5] and all results showed that SC-PTM with HARQ/CSI feedback has more gain than that without any feedback. So, RAN2 should assume an option to configure SC-PTM transmission with UL feedback.

Proposal 1: The serving cell should have a means to configure SC-PTM transmission with UL feedback.

Some assumptions for UL feedback could be seen in these evaluations as follows;
Assumption 1: Both HARQ and CSI feedbacks
Assumption 2: CSI-only feedback
Assumption 3: HARQ-only feedback Both HARQ and CSI feedback provides the highest performance in spectral efficiency, while it will cause the largest overhead. The CSI-only feedback scheme shows sub-optimal performance, and it is also observed in the HARQ-only scheme (Technique 4 and "ptm-RA+NR"). Considering overhead due to the feedback, HARQ feedback (i.e., 1 bit) is more beneficial than CSI feedback (i.e., 4 bit for CQI and optionally PMI+PTI+RI). So, the HARQ-only feedback is slightly preferable scheme for SC-PTM. In addition, the HARQ-only feedback, which can be used for not only HARQ retransmission but also MCS adjustment, is expected to need easier control mechanism than CSI feedback.

Proposal 2: RAN2 should assume SC-PTM with HARQ feedback for link adaptation in RRC Connected.

If Proposal 2 is acceptable, there is an issue to reuse the existing HARQ feedback scheme for SC-PTM transmission, since the current scheme is designed for unicast transmission. Considering SC-PTM transmission is received by multiple UEs, the PUCCH resource for corresponding HARQ feedback is also shared by multiple UEs, where the existing reception of HARQ feedback does not assume multiple feedback transmissions. So, such multiple transmissions of HARQ feedback cause reception error. A possible solution would be implied, the "NACK-only" scheme. In addition to the concept of "NACK-only" feedback, if the receiver in the serving cell detects the NACK in power-domain, whereby the NACK signals are transmitted from multiple UEs with a pre-defined and/or group-specific sequence like SR/PRACH, then the feedback resource for SC-PTM transmission may be shared by the UEs, since the multiple NACK signals are combined in the air and it could be seen as a single NACK feedback over multi-path at the receiver.

Proposal 3: RAN2 should assume "NACK-only" feedback within a shared feedback resource among multiple UEs receiving an SC-PTM transmission.

If Proposal 2 is not agreeable, i.e., no HARQ feedback is assumed, it should be still considered whether a "Soft" link adaptation with RRC signalling would be a useful alternative, e.g., some sort of indication from the UE like the UEAssistanceInformation or MBMSInterestIndication for SC-PTM. The UE should inform the serving cell of the reception error of SC-PTM and/or a desired MCS within the indication, then the serving cell could increase the robustness of the SC-PTM. This scheme is not assumed to be needed at a subframe-by-subframe level; therefore, such semi-dynamic link adaptation could be adopted with little RAN1 impact.

Proposal 4: If Proposal 2 is not agreeable, RAN2 should consider link adaptation of SC-PTM in Connected based on feedback over RRC signalling from UEs.

Link Adaptation in RRC Idle Mode

The LS reply mentions that RAN1 has only considered the case where CSI and HARQ or HARQ only feedback is provided by all UEs receiving SC-PTM and all UEs receiving SC-PTM are in RRC_CONNECTED state, yet. If the group of UEs receiving SC-PTM consist of UEs in both RRC_IDLE and RRC_CONNECTED states, the link adaptation and/or retransmissions based on CSI and/or HARQ feedback may not be applicable. When a UE experiences the reception problem of SC-PTM, the UE is allowed to have two ways for continuous reception of SC-PTM; The UE transitions to RRC Connected then either sends HARQ feedback corresponding to SC-PTM (if Proposal 2 is acceptable) or establishes a Unicast bearer for the MBMS service. These behaviours should be the baseline since any standard impacts may not be expected or be minimal (if any).

Observation 1: The UE in Idle needs to transition to RRC Connected when it experiences the reception problem of SC-PTM.

However, the transition to RRC Connected will cause not only additional power consumption in the UE but also additional loads in the serving cell. For example, if the UE decides to establish a new Unicast bearer for the concerned MBMS service (instead of SC-PTM reception), it may cause degradation of the spectral efficiency since the same data is still provided over SC-PTM. To avoid establishments of more Unicast bearer, it could be considered to introduce the HARQ feedback for SC-PTM. Although HARQ feedback works well for most cases, there are rooms to improve the power consumption for the UE which has only interested in SC-PTM reception.

In addition, some failure cases should be considered, e.g., RRCConnectionReject due to congestion. If the UE experiencing bad reception of SC-PTM initiates RRCConnectionRequest but it's rejected by the serving cell, the UE may perform cell reselection and re-initiate RRCConnectionRequest for service continuity. It's not power efficient way for the UE and also the serving cell has no way to know whether current MCS for SC-PTM is adequate or not at the end.

Therefore, as agreed to support SC-PTM reception by UEs in IDLE and will investigate related aspects, it's worth studying how to handle link adaptation involving the UEs in Idle.

Proposal 5: RAN2 should consider how to handle link adaptation for Idle UEs and study on possible enhancements in idle mode.

If Proposal 5 is agreeable, it should be worth considering the link adaptation mechanism even if the UE stays in RRC Idle. Two possible alternatives could be considered.

Alternative 1: "Relaxed" link adaptation with RRC Connection Request

The discussion in RAN2#89-bis pointed out that UEs would CONNECT once they experience too many errors. Then, the eNB would know about the bad link and could increase the robustness as a "relaxed" link adaptation. As the specification impact, the EstablishmentCause in the RRC-ConnectionRequest may be extended, e.g., in order to clarify this transition is due to reception error of the SC-PTM(s) which corresponds to TMGI(s) of interest. With this alternative, the serving cell may also have an option to always reject the RRCConnectionRequest if the EstablishmentCause is just for link adaptation of SC-PTM.

Alternative 2: "Accurate" link adaptation with NACK-only and feedback pool

This alternative assumes NACK-only scheme, i.e., Proposal 3, and also a "feedback pool" like the PRACH resource and/or the D2D resource pool. The UE in Idle is allowed to transmit NACK within the "feedback pool", without timing alignment and transition to RRC Connected. If the "feedback pool" is defined also for RRC Connected, the common "feedback pool" for RRC Connected and Idle may be shared by all the UEs receiving the SC-PTM. In exchange for these benefits, the biggest specification impact is assumed.

Unless the reception quality of SC-PTM for UEs in Idle is ignored, i.e., best-effort reception, RAN2 should discuss how to ensure at least moderate quality of SC-PTM reception in Idle UEs. Alternative 1 will work with simple extension of the current specification, although it may cause data loss since any retransmission for the error data is assumed. Alternative 2 has benefits for not only link adaptation but also retransmission, and it may also offer a unified solution for both UEs in Idle and Connected, while big efforts in standardization would be expected. Considering SC-PTM is assumed for MCPTT use, more robust reception is desirable, i.e., to minimize data loss. So, Alternative 2 is worth considering further in RAN2.

Proposal 6: RAN2 should discuss whether the Idle UEs should be allowed to send feedback for link adaptation/retransmission, when SC-PTM data is not successfully received.

The invention claimed is:

1. A user terminal, comprising:
a processor and a memory coupled to the processor, the processor configured to
receive multicast/broadcast data transmitted from a base station to a plurality of user terminals using the same downlink radio resources;
select uplink radio resources to be used for transmission of feedback information, from a resource pool allocated from the base station to a group including the plurality of user terminals;
transmit the feedback information to the base station using the selected uplink radio resources; and
perform switching from a first mode in which the feedback information is transmitted using the resource pool, to a second mode in which the feedback information is transmitted using a physical uplink control channel which is individually allocated from the base station to each of the user terminals, in response to a notification given from the base station.

2. The user terminal according to claim 1,
wherein the resource pool includes uplink radio resources different from the physical uplink control channel.

3. The user terminal according to claim 1,
wherein the processor is configured to receive configuration information related to the resource pool from the base station, and
the configuration information includes at least one of
a difference between a reference point on a time axis and a start point of the resource pool,
a difference between a reference point on a frequency axis and a start point of the resource pool,
a range of the resource pool on the time axis, and
a range of the resource pool on the frequency axis.

4. The user terminal according to any one of claim 1,
wherein the processor is configured to select uplink radio resources used for transmission of the feedback information from the resource pool on the basis of unique information allocated from the base station to the user terminal or unique information preconfigured to the user terminal.

5. The user terminal according to claim 1,
wherein the processor is configured to transmit the feedback information using the uplink radio resources selected from the resource pool when the user terminal is in an RRC idle state.

6. The user terminal according to claim 5,
wherein the processor is configured to transmit the feedback information in the RRC idle state without performing a timing advance adjustment.

7. The user terminal according to claim 5,
wherein a guard region for permitting a transmission error in a frequency direction and/or a time direction is set in the resource pool.

8. The user terminal according to claim 5,
wherein the processor is configured to receive configuration information related to the resource pool from the base station, and
the configuration information includes an open loop transmission power control parameter to be applied for transmission of the feedback information.

9. The user terminal according to claim 5,
wherein the processor is configured to transmit the feedback information in the RRC idle state only when a notification of a necessity of transmission of the feedback information in the RRC idle state is given from the base station.

10. The user terminal according to claim 1,
wherein the feedback information is one of a plurality of index values,
a plurality of resource pools corresponding to the plurality of index values are allocated from the base station to the user terminal, and
when a predetermined index value is transmitted to the base station as the feedback information, the processor selects a resource pool corresponding to the predetermined index value among the plurality of resource pools.

11. The user terminal according to claim 10,
wherein a radio resource common to the plurality of user terminals and/or a signal sequence common to the plurality of user terminals are associated with each of the plurality of resource pools, and
the processor is configured to transmit the feedback information to the base station using the common radio resources and/or the common signal sequence corresponding to the selected resource pool.

12. A base station, comprising:
a processor and a memory coupled to the processor, the processor configured to
allocate a resource pool usable for transmission of feedback information to a group including a plurality of user terminals;
transmit multicast/broadcast data to the plurality of user terminals using the same downlink radio resources;
receive the feedback information transmitted from the plurality of user terminals using uplink radio resources selected from the resource pool;
determine whether or not switching from a first mode in which the feedback information is transmitted using the resource pool, to a second mode in which the feedback information is transmitted using a physical uplink control channel which is individually allocated from the base station to each of the user terminals; and
notify the plurality of user terminals of a determination result.

13. The base station according to claim 12,
wherein the resource pool includes uplink radio resources different from the physical uplink control channel.

14. The base station according to claim 12,
wherein the processor is configured to transmit configuration information related to the resource pool to the plurality of user terminals, and
the configuration information includes at least one of
a difference between a reference point on a time axis and a start point of the resource pool,
a difference between a reference point on a frequency axis and a start point of the resource pool,
a range of the resource pool on the time axis, and
a range of the resource pool on the frequency axis.

15. A method for a user terminal, comprising:
receiving multicast/broadcast data transmitted from a base station to a plurality of user terminals using the same downlink radio resources;
selecting uplink radio resources to be used for transmission of feedback information, from a resource pool allocated from the base station to a group including the plurality of user terminals;
transmitting the feedback information to the base station using the selected uplink radio resources; and
performing switching from a first mode in which the feedback information is transmitted using the resource pool, to a second mode in which the feedback information is transmitted using a physical uplink control channel which is individually allocated from the base station to each of the user terminals, in response to a notification given from the base station.

* * * * *